US006628347B1

United States Patent
Oohata et al.

(10) Patent No.: US 6,628,347 B1
(45) Date of Patent: Sep. 30, 2003

(54) OPTICAL WRITING TYPE LIQUID CRYSTAL LIGHT VALVE APPARATUS AND PRODUCING METHOD THEREOF

(75) Inventors: Toyoharu Oohata, Kanagawa (JP); Hideharu Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/360,620

(22) Filed: Jul. 26, 1999

(30) Foreign Application Priority Data

Aug. 4, 1998 (JP) .......................................... P10-220694

(51) Int. Cl.[7] .............................................. G02F 1/135
(52) U.S. Cl. ............................................ 349/25; 349/27
(58) Field of Search .............................. 349/25, 27, 28, 349/29, 30

(56) References Cited

U.S. PATENT DOCUMENTS 4,196,974 A * 4/1980 Hareng et al. ................. 349/25
4,277,145 A * 7/1981 Hareng et al. ................. 349/25
5,076,670 A * 12/1991 Sayyah ......................... 349/27
5,612,800 A * 3/1997 Braatz et al. .................. 349/27

* cited by examiner

*Primary Examiner*—Robert H. Kim
*Assistant Examiner*—Dung Nguyen
(74) *Attorney, Agent, or Firm*—Sonnenschein, Nath & Rosenthal LLP

(57) ABSTRACT

An optical writing type liquid crystal light valve apparatus is composed so as to have at least first and second transparent substates, a photoconductive layer, first and second electrodes which are arranged so as to contract with and sandwich the photoconductive layer or arranged on one surface of the photoconductive layer, an optical reflective layer, a liquid crystal layer and a third electrode. The second electrode is composed of split electrode sections obtained by splitting the second electrode into a plurality of electrode sections. Opposing areas, which face each other via the photoconductive layer, of the photoconductive layer which the first electrode and the split electrode sections of the second electrode are set to be smaller than an area of the split electrode section of the second electrode.

20 Claims, 13 Drawing Sheets

OPTICAL WRITING TYPE LIQUID CRYSTAL LIGHT VALVE APPARATUS AND PRODUCING METHOD THEREOF

RELATED APPLICATION DATA

The present application claims priority to Japanese Application No. P10-220694 filed Aug. 4, 1998, which application is incorporated herein by reference to the extent permitted by law.

BACKGROUND OF THE INVENTION

1. Field of the Invention

The present invention relates to an optical writing type liquid crystal light valve apparatus and a producing method thereof. The present invention improves sensitivity with respect to a writing light and a spatial resolving power in the optical writing liquid crystal light valve apparatus.

2. Description of the Related Art

A liquid crystal light valve apparatus (LCLV) is an optical-optical image converter.

The light valve is such an apparatus that receives a light with low light intensity and reads an optical image by means of a light from another light source in real time so as to be capable of outputting the optical image.

The LCLV has been utilized as an application to a large-sized screen for military use and commercial use. For example, an LCLV, which was announced by Rodney D. Sterling of Hughes et al. in "Video-Rate Liquid Crystal Light-Valve Using an Amorphous Silicon Photo Detector", SID, '90 Digest, Paper No. 17A 2, pp327–329 (1990), as shown in a schematic cross-section of FIG. 1, is constituted so that a transparent electrode 2 is formed on a first transparent glass substrate 1, and a photoconductive layer 3 which is made of an amorphous silicon (herein after referred to as a-Si) and whose thickness is large and continuously uniform is formed thereon, and further a light shielding layer 4 made of CdTe or the like and a dielectric mirror 5 as an optical reflective layer is laminated thereon, and an alignment layer 6 is formed on the dielectric mirror.

Meanwhile, a second transparent glass substrate 7 is prepared, and a transparent electrode 8 and an alignment layer 9 are formed thereon similarly.

The first and second glass substrates 1 and 7 are opposed to each other with a gap of about several $\mu$m with the sides where the alignment layers 6 and 9 are formed being directed inside, and liquid crystal is filled between the substrates 1 and 7 so that a liquid crystal layer 10 is formed. The LCLV is constituted in such a manner.

In this LCLV, the side of the second glass substrate 7 is set as an observation side for an optical image, and a reading light LR is irradiated on the glass substrate 7 vertically from the glass substrate 7 side by a polarized light. At this time, the reading light passes through the transparent electrode 7 and the liquid crystal layer 10 and is reflected on the dielectric mirror 5, and passes through the liquid crystal layer 10 and the glass substrate 7 again so as to be emitted to the outside. In such a manner, the reflected light can be observed.

On the contrary, while an alternating voltage AC is being applied between the transparent electrodes 2 and 8 in the state that the reading light LR is irradiated, a writing light LW is irradiated from the first glass substrate 1 side. Then, the writing light LW passes through the first glass substrate 1 and the transparent electrode 2 and is irradiated onto the photoconductive layer 3, and the photoconductive layer 3 is activated on this irradiated portion so that electron-hole pairs are generated. As a result, electrostatic capacity of the photoconductive layer 3 is increased, a resistance value thereof is decreased and voltages sandwiching the liquid crystal layer are increased according to a pattern corresponding to an irradiating pattern and the intensity of the writing light LW. This spatial change in the voltage becomes a change in a direction of liquid crystal molecules, and this change causes birefringence and rotation of the reading light LR which passes the liquid crystal layer, and the azimuth (polarization) of the reading light LR is modulated. Therefore, when the reading light emitted from the second glass substrate 7 is finally allowed to pass through a deflecting plate, the reading light can be observed as a change in light quantity. In other words, an optical image according to a pattern of the writing light LW, namely the optical image can be observed from the side of the second glass substrate 7.

Here, the light shielding layer 4 is arranged between the dielectric mirror 5, namely, the light reflective layer and the photoconductive layer 3, so that even a slight quantity of the reading light, which has passed through the light reflective layer, is absorbed by the light shielding layer 4. Namely, the light shielding layer 4 is disposed so as to avoid that the reading light LR reaches the photoconductive layer 3 to activate the photoconductive layer 3 and to generate an image other than a writing light, in other words, noises are produced.

Incidentally, in the above LCLV, in order to obtain high sensitivity, it is desired to make a voltage, which is applied to the liquid crystal layer according to a change in the resistance value of the photoconductive layer 3, to be maximum. The maximum voltage is achieved when the impedance of the photoconductive layer 3 on which the light is not irradiated and the impedance of the liquid crystal layer 10 satisfy the following condition.

That is, impedance, which is generated by a parallel circuit of equivalent capacity and bulk resistance of the photoconductive layer 3, is set so as to be substantially equal with or exceed impedance, which is generated by a parallel circuit of capacity and resistance of the liquid crystal layer 10 (this condition is referred to as a balancing relationship).

Then, the balancing relationship can be realized by, concretely, setting a film thickness of the photoconductive layer made of a-Si to become about 30 $\mu$m.

The film thickness of 30 $\mu$m is required because when the balancing relationship between the impedances of the photoconductive layer 3 and the liquid crystal layer 10 is tried to be set, a dielectric constant of the photoconductive layer 3 due to the a-Si film is higher than a dielectric constant of the liquid crystal layer 10.

However, when the photoconductive layer made of the a-Si layer has a thickness up to 30 $\mu$m in such a manner, electric charges generated on the photoconductive layer are easily diffused in an adjacent area because of the incidence of the writing light.

Namely, an ideal LCLV is constituted so that its photoconductive layer has high resistance such that electric charges generated due to light irradiation can be prevented from diffusing in a lateral direction. However, if the thickness of an a-Si photoconductive layer becomes up to about 30 $\mu$m, sufficiently high resistance cannot be obtained, and thus the electric charges in the lateral direction (surface direction) easily diffuse. As a result, spatial contrast is lowered and resolution is lowered.

In order to avoid such inconvenience, such a trial was carried out that dopant was added to an a-Si layer composing the photoconductive layer so that resistivity was improved. In this method, when the a-Si film is deposited, since this film has a property such that n-type dopant is originally generated, the n-type dopant is canceled by doping p-type dopant such as boron.

However, according to this method, since the effect of addition of the dopant is extremely great and the occurrence of the n-type dopant varies every time the a-Si film is deposited, it is actually very difficult to accurately dope the p-type dopant for setting desired resistivity. As a result, the production cost is increased, and yield is lowered.

Accordingly, a split structure, such that a photoconductive layer is separated completely at every pixel, is suggested (U.S. Pat. No. 5,076,670). This separation is executed by pattern etching using photo-lithography, for example, but as mentioned above, when the photoconductive layer having a large thickness up to 30 $\mu$m is pattern-etched, time required for the work becomes longer, and further it is difficult to clearly pattern the photoconductive layer. Moreover, an insulating material is embedded into grooves between the separated photoconductive layers, but the work for embedding the insulating material into the grooves, whose aspect ratio (a ratio of a groove depth d to a width w: d/w) is high, is complicated. Thus causes problems such that the cost becomes high and satisfactory reliability is not obtained.

In addition, it is suggested that a photoconductive layer made of a-Si of high dielectric constant is formed selectively into holes which are formed on pixel formed areas of an insulating layer with low dielectric constant (U.S. Pat. No. 5,612,800). However, also in this case, since the dielectric constant of the insulating layer is about $\frac{1}{3}$ of the dielectric ratio of a-Si, it is considered that the photoconductive layer requires a thickness of 10 $\mu$m which is about $\frac{1}{3}$ of the conventional thickness. For this reason, the film thickness cannot be made to be sufficiently small. Moreover, in this case, since the photoconductive layer is formed into a thin pillar shape, an effective cross section of a light receiving section of the photoconductive layer is decreased to about 4%, and thus the sensitivity for a writing light is lowered greatly. Therefore, in order to supplement this situation, a microlens array, where microlenses for converging a writing light onto the pillars of the photoconductive layer are arranged at respective pillars, is arranged. However, in this case, since the step of producing the microlens array and the step of locating the microlens array are complicated, and high accuracy is required, mass production is hindered and the cost becomes higher.

In addition, as shown in a schematic sectional view in FIG. 2, there suggests a structure such that a conductive layer 11 with high reflectance and low resistivity is formed selectively so as to oppose a transparent electrode 2 across a photoconductive layer 3, and an insulating layer 12 is formed between the adjacent conductive layers 11 (in FIG. 2, the same reference numerals are given to portions corresponding to those in FIG. 1 and the description thereof is omitted).

In this case, the collection of electric charges generated in the photoconductive layer 3 due to the conductive layer 11 are promoted, and a reading light which passed through a dielectric mirror 5 is reflected so as not to enter the photoconductive layer 3 without providing the light shielding layer 4 in FIG. 1.

However, also in the case of this structure, since an opposing area between the conductive layer 11 and the transparent electrode 2 opposing each other across the photoconductive layer 3 becomes larger, it is necessary for reducing capacity of the photoconductive layer to increase a thickness of the photoconductive layer 3 as usual.

In addition, from the viewpoint of preventing the electric charges between the pixels from diffusing, there suggests a structure such that only a part of the photoconductive layer is separated by an element separation insulating layer area between the elements, and thus the elements are not separated completely (U.S. Pat. No. 4,913,531). However, according to this method only, it is expected that the diffusion of electric charges generated in the photoconductive layer by a writing light to an adjacent element area can be reduced slightly, but a problem of planar lowering of resolution cannot be solved completely. Moreover, there still exists a problem that a photoconductive layer with large thickness is required.

In addition, Japanese Patent Application Laid-Open No. 9-197432 discloses a structure such that an intermediate electrode is arranged so as to face a transparent electrode across a photoconductive layer, and the intermediate electrode is composed by split electrodes, and an area of the transparent electrode which faces the split electrodes is set to be small so that capacity concerning the photoconductive layer is reduced. However, in this case, since an opposing area between the split electrodes and the transparent electrode is determined by an area of the transparent electrode, for example, a width, when this area is set to be sufficiently small, distributed resistance of the transparent electrode is increased, and thus a problem of responsibility arises occasionally.

In addition, in order to prevent a reading light from entering an a-Si photoconductive layer on the writing side through a dielectric mirror and from influencing an input image by the incident light, as mentioned above with reference to FIGS. 1 and 2, a light shielding layer 4 made of CdTe is provided.

However, since this CdTe layer has a photoconductive characteristic originally, when a leaked reading light is made incident on the CdTe light shielding layer, electron-hole pairs are generated in the CdTe light shielding layer. As a result, since the light shielding layer shields the electric charges which are generated in the photoconductive layer by a writing light, spatial resolution of an image on the reading side is lowered.

In addition, the CdTe is a material having toxicity, and thus its handling is complicated and disposal of it causes a problem. Accordingly, from the viewpoints of these problems and of a rise in the production cost and earth environmental protection, the use of CdTe is desired to be avoided.

SUMMARY OF THE INVENTION

The present invention has been achieved in order to solve the above-mentioned problems. In an optical writing type liquid crystal light valve apparatus, a voltage applied to a liquid crystal layer is made to be as maximum as possible, and a photoconductive layer is thinned so as to have a thickness of about 1 to 2 $\mu$m which is required for absorption of a writing light into the photoconductive layer, and a light shielding layer composed of a CdTe film can be omitted.

Namely, it is an object of the present invention to provide an optical writing type liquid crystal light valve apparatus which is capable of realizing high sensitivity and high resolution, and improving productivity such as reduction in difficulty of the producing process and the production cost, and being suitable for earth environmental protection, and to provide a producing method thereof.

An optical writing type liquid crystal light valve apparatus of the present invention is constituted so as to have at least first and second transparent substrates, a photoconductive layer, first and second electrodes arranged so as to sandwich the photoconductive layer, an optical reflective layer, a liquid crystal layer, and a third electrode.

The second electrode is composed of split electrode sections which are obtained by dividing the second electrode into plural electrode sections, and at least one portion of the first electrode is provided at a position which faces gaps between the split electrode sections. An opposing area between the first and second electrodes is set so as to be smaller than an area of the second electrodes.

In addition, similarly to the above apparatus, an optical writing type liquid crystal light valve apparatus of the present invention is constituted so as to have at least first and second transparent substrates, a photoconductive layer, first and second electrodes, an optical reflective layer, a liquid crystal layer and a third electrode, in which the first and second electrodes are arranged on a same surface side of the photoconductive layer.

In addition, the second electrode is composed of split electrode sections which are obtained by dividing the second electrode into plural electrode sections, and the first electrode is arranged between the split electrode sections.

In addition, similarly to the above apparatuses, an optical writing type liquid crystal light valve apparatus of the present invention is constituted so as to have at least first and second transparent substrates, a photoconductive layer, first and second electrodes, an optical reflective layer, a liquid crystal layer and a third electrode, in which the first and second electrodes are arranged so as to sandwich the photoconductive layer or arranged on a same surface side of the photoconductive layer.

The second electrode is composed of split electrode sections which are obtained by dividing the second electrode into plural electrode sections, and the split electrode sections are composed so as to have an opposing electrode section which faces the third electrode across the liquid crystal layer and a contact section which is electrically connected with the opposing electrode section and comes in contact with the photoconductive layer. The contact area of the contact section with the photoconductive layer is set so as to be smaller than an area of the opposing electrode section.

In addition, a method of producing an optical writing type liquid crystal light valve apparatus according to the present invention having at least first and second transparent substrates, a photoconductive layer, first and second electrodes which are arranged so as to contact with the photoconductive layer, an optical reflective layer, a liquid crystal layer and a third electrode, the second electrode being composed of plural split electrode sections, the method includes the step of forming an electric charge diffusion restricting area, for selectively restricting diffusion of electric charges, on the photoconductive layer.

In the above structures, an alternating voltage is applied between the first and third electrodes, and a writing light is allowed to enter from the side of the first transparent substrate, and a polarized reading light is allowed to enter from the side of the second transparent substrate. As a result, electron-hole pairs are generated in the portion of the photoconductive layer on which the writing light is irradiated, and the capacity of the photoconductive layer is increased according to the intensity of the irradiated light so that resistance is lowered. For this reason, impedance between the split electrode sections of the second electrode and the first electrode on the writing light irradiated portion under the irradiated portion of the writing light for the photoconductive layer is lowered, and the voltage between the split electrode sections and the third electrode which sandwich the liquid crystal layer is increased. Namely, the voltage is applied to the liquid crystal layer according to the intensity on the writing light irradiated portion, and birefringence and rotation of the reading light are executed. When the reading light emitted from the second transparent substrate is detected through a deflecting plate, an optical image can be obtained by the reading light of a pattern according to a pattern of the writing light.

In the optical writing type liquid crystal light valve apparatus of the present invention, when the substantial opposing area between first and second electrodes arranged via the photoconductive layer is made small, the opposing area is reduced or when the substantial distance between the first and second electrodes is increased, the capacity of the photoconductive layer is reduced. As a result, the thickness of the photoconductive layer can be small in order to set a relationship where the impedance of the photoconductive layer is balanced with the impedance of the liquid crystal layer.

At least one portion of the first electrode is arranged at the position which faces the gaps between the split electrode sections of the second electrode, or arranged between the split electrode sections on so as to form a plane. The contact sections which contact with the photoconductive layer with a small area are formed on the split electrode sections. As a result, the opposing area between the first and second electrodes can be substantially reduced without reducing the area, i.e., width of the first electrode.

In addition, the method of producing the optical writing type liquid crystal light valve apparatus according to the present invention has the step of forming an electric charge diffusion restricting area, for selectively restricting diffusion of electric charges, on the photoconductive layer. When the electric charge restricting area is formed on the photoconductive layer in such a manner, the diffusion of the electric charges in the surface direction can be avoided efficiently. The lowering of the contrast between the pixels due to giving/receiving of the electric charges between the adjacent pixels can be avoided efficiently, and thus image quality can be improved.

DETAILED DESCRIPTION OF THE PREFERRED EMBODIMENTS

An optical writing type liquid crystal light valve apparatus of the present invention is basically composed of at least first and second transparent substrates, a photoconductive layer, first and second electrodes which are arranged so as to come in contact with the photoconductive layer, respectively, an optical reflective layer, a liquid crystal layer and a third electrode.

The second electrode is composed of split electrode sections obtained by splitting the electrode into plural electrode sections for each pixel, for example, and the split electrode sections of the second electrode come in contact with the photoconductive layer. An area of the contact portions facing the first electrode across the photoconductive layer is set so as to be substantially smaller than an area of the split electrode section of the second electrode.

An example of the optical writing type liquid crystal light valve apparatus of the present invention will be described with reference to the schematic sectional views of FIGS. 3 through 21 showing its main section, but the present invention is not limited to these structures.

Figure 3:
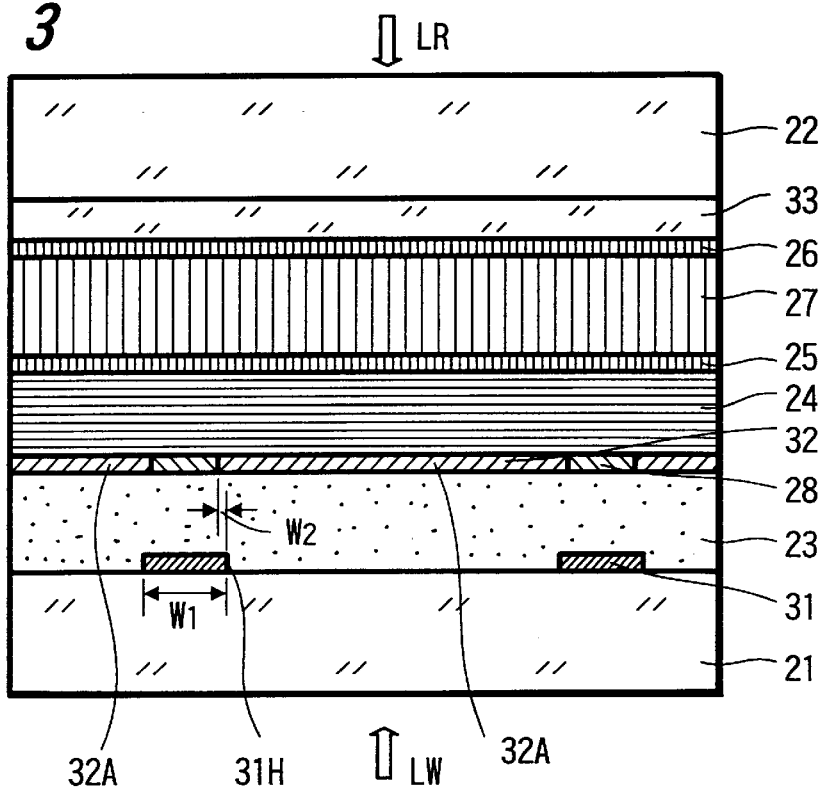
FIG. 3 is a schematic sectional view showing a main section of a optical writing type liquid crystal light valve apparatus of the present invention as one example.

In the example of FIG. 3, first and second electrodes 31 and 32 are arranged so as to sandwich a photoconductive layer 23.

Also in the apparatus of the present invention, first and second transparent substrates 21 and 22 made of, for example, a glass substrate are prepared. "Transparent" of the first and second transparent substrates 21 and 22 means that the first transparent substrate 21 is transparent for a writing light LW, namely, it shows high transmittance, and the second transparent substrate 22 is transparent for a reading light LR, namely it shows high transmittance.

The first electrode 31 is formed on one main or major surface of the first transparent substrate 21, and the photoconductive layer 23 is formed thereon. The second electrode 32, which is composed by arranging split electrode sections 32A which are obtained by splitting the electrode into plural electrode sections at every or each pixel, for example, is formed thereon, and further, a reflective layer 24 which is composed of a dielectric mirror, for example, is formed thereon. An alignment layer 25 where liquid crystal is aligned is formed on the surface of the reflective layer 24.

In addition, a third electrode 33 is formed on one major or main surface of the second transparent substrate 22 so as to cover a whole area of a liquid crystal layer 27, and an alignment layer 26 where liquid crystal is aligned is formed on the surface of the third electrode 33.

The first and second transparent substrates 21 and 22 on their sides of the alignment layers 25 and 26 face each other, and an interval therebetween is held in a predetermined interval by intervening glass beads (not shown), for example, and the periphery thereof is sealed. As a result, a flat space is formed between the transparent substrates 21 and 22, and liquid crystal is poured thereinto so that the liquid crystal layer 27 is formed.

The first electrode 31 is formed into a matrix pattern, for example, in a manner that a metallic layer made of Cr, W, Al or the like is formed on the transparent substrate 21 by evaporation, sputtering or the like, and a plurality of openings 31H are bored by photo-lithography at a predetermined interval.

A photoconductive layer 23 is deposited wholly on the first transparent substrate 21 on which the first electrode 31 was formed by sputtering an a-Si layer or by a CVD (Chemical Vapor Deposition) method or the like.

Then, the second electrode 32 is formed on the photoconductive layer 23. The second electrode 32 is constituted so that a metallic layer, which is made of Al, Cr, W or the like and has a characteristic such that a writing light and a reading light are shielded, is formed wholly by vacuum evaporation, sputtering or the like and is pattern etched by photo-lithography so that the plural split electrode sections 32A which are split for each pixel and has a square pattern, for example, are arranged in a matrix pattern along the surface of the photoconductive layer 23.

An insulating layer 28 made of $SiO_2$, SiN or the like is embedded and formed between the split electrode sections 32A. In another way, the insulating layer 28 is first formed into a predetermined pattern, and as mentioned above, the split electrode sections 32A are formed in areas which are separated by the insulating layer 28.

The optical reflective layer 24 is formed on the whole surface of the second electrode 32. The reflective layer 24 can be composed by a normal multi-layered structure, namely, a so-called dielectric mirror, and the alignment layer 25 which is formed thereon also has a normal structure.

In addition, the third electrode 33, which is formed on one main surface of the second transparent substrate 22, is formed by a transparent conductive layer made of ITO (indium tin oxide) or the like in a normal manner, and the alignment layer 26 which is formed thereon has also a normal structure.

In the structure of FIG. 3, a positional relationship between the first and second electrodes 31 and 32 is set so that particularly at least one portion of a lattice section of the first electrode 31 is positioned, for example, between all the split electrode sections 32A of the second electrode 32.

In the example of FIG. 3, the lattice section of the first electrode 31 is positioned so as to face gaps between the split electrode sections 32A of the second electrode 32, and a width $W_1$ (hereinafter, a pattern width) of the lattice section of the first electrode 31 is set so as to be larger than a width between the split electrode sections 32A. Moreover, the facing portions of the first and second electrodes face each other with a width $W_2$.

However, a positional relationship can be set so that the lattice portion of the first electrode 31 is positioned so as not to face correctly the gaps between the split electrode sections 32A of the second electrode 32, and for example, they can be shifted in any one direction.

The first electrode 31 can be formed by a transparent electrode of ITO or the like having light transparency for the writing light LW incident from the side of the first transparent substrate 21, mentioned later. In another way, the first electrode 31 can be composed by an opaque electrode such as a metallic electrode.

In this structure, an alternating voltage is applied between the first and third electrodes, and the writing light LW is made incident from the side of the first transparent substrate 21, and the polarized reading light LR is made incident from the side of the second transparent substrate 22.

As a result, the writing light LW transmits through the first transparent substrate 21, and in the case where the first electrode 31 is transparent, the writing light LW transmits therethrough. Then, the writing light LW enters the photoconductive layer 23 through the openings 31H. The photoconductive layer 23 is selectively activated in its portion where the writing light LW is made incident, and electron-hole pairs are generated. The capacity of the photoconductive layer 23 is increased according to intensity of the irradiated light, and the resistance thereof is lowered.

For this reason, the impedance between the split electrode sections 32A of the second electrode 32 positioned in the portion where the writing light was irradiated and the first electrode 31 is lowered, and the voltage between the split electrode sections 32A and the third electrode 33 across the liquid crystal layer 27 is increased. In other words, a voltage is applied to the liquid crystal layer on the portion where the writing light was irradiated according to the intensity thereof, and birefringence and rotation of the reading light are executed. When the reading light which comes out from the second transparent substrate is detected through a polarizing plate, an optical image can be obtained by the reading light with a pattern according to the pattern of the writing light.

According to the optical writing type liquid crystal light valve apparatus of the present invention, since the substantial opposing width $W_2$ of the first and second electrodes 31 and 32 can be set so as to be sufficiently smaller than the pattern width $W_1$ of the first electrode 31 or satisfy the relationship $W_2 \leq 0$, while distributed resistance of the first electrode 31 is maintained to be sufficiently low, the substantial opposing area between the first and second electrodes 31 and 32, thus the capacity relating to the photoconductive layer can be small.

Therefore, the thickness of the photoconductive layer 23 which sets a balancing relationship in the impedance can be set to be thin, for example, up to about 1 to 2 $\mu$m that is required for the absorption of the writing light LW into the photoconductive layer 23. Accordingly, diffusion of electric charges in the lateral direction (surface direction) in the photoconductive layer 23 can be reduced, and thus high resolution can be realized and the production can be simplified.

In addition, in the apparatus of the present invention, an electric charge diffusion restricting area for restricting the movement or diffusion of electric charge can be provided in a portion of the photoconductive layer 23 where move of the electric charges generated by the writing light LW, namely, giving and receiving of the electric charges should be avoided.

The electric charge diffusion restricting area can adopt various structures as follows. The portion of the photoconductive layer 23 where the electric charge diffusion restricting area is formed is made thin. An insulating layer is embedded into a part of this portion so that the substantial thickness of this portion is made to be small. A cross section of a passage of the electric charges is set to be small. Specific resistance of this area is heightened or trap of the electric charges and density of recombination center is heightened and thus mobility of the electric charges is lowered so that a substantial diffusion distance is reduced. A potential barrier is formed against the electric charges. Further, this area is composed of an insulating layer itself.

A method of producing such an optical writing type liquid crystal light valve apparatus has the step of forming the electric charge diffusion restricting area. The electric charge diffusion restricting area is formed in the photoconductive layer in the following manners. For example, after the photoconductive layer is formed, an ion such as $O_2$, $N_2$ or the like is implanted by a selective ion implantation so that an insulting layer is formed locally. Or an ion such as Ar, Xe or the like is implanted so that an area where trap of the electric charges and density of the recombination center thereof are heightened is formed. Or an area into which impurities such as B, P, As and so on are introduced is formed so that a potential barrier against the electric charges is formed.

This electric charge diffusion restricting area can be formed over the whole thickness of the photoconductive layer, or can be formed over a portion of the thickness on the side where the second electrode 32 was formed.

In addition, the insulating layer, which is used for forming the electric charge diffusion restricting area 40, can be formed also by oxidation or by nitriding treatment by means of plasma enhancement.

In one optical writing type liquid crystal light valve apparatus, the electric charge diffusion restricting area obtained by the respective methods of respective structures can be constituted by combining more than one kind of the aforementioned structures.

Figure 4:
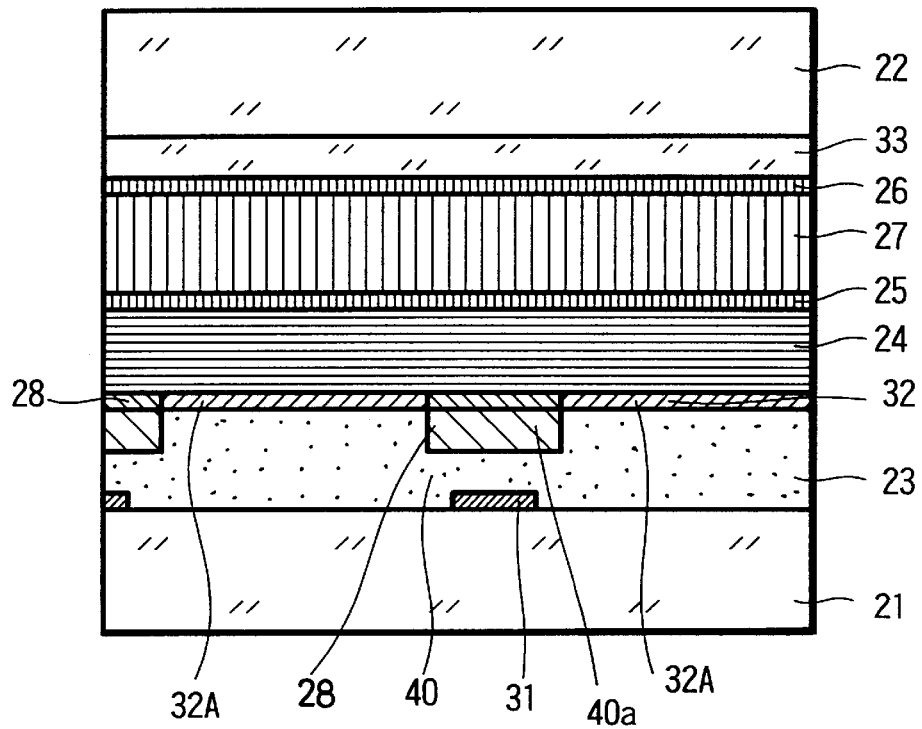
FIG. 4 is a schematic sectional view showing the main section of the optical writing type liquid crystal light valve apparatus of the present invention as another example.
Figure 5:
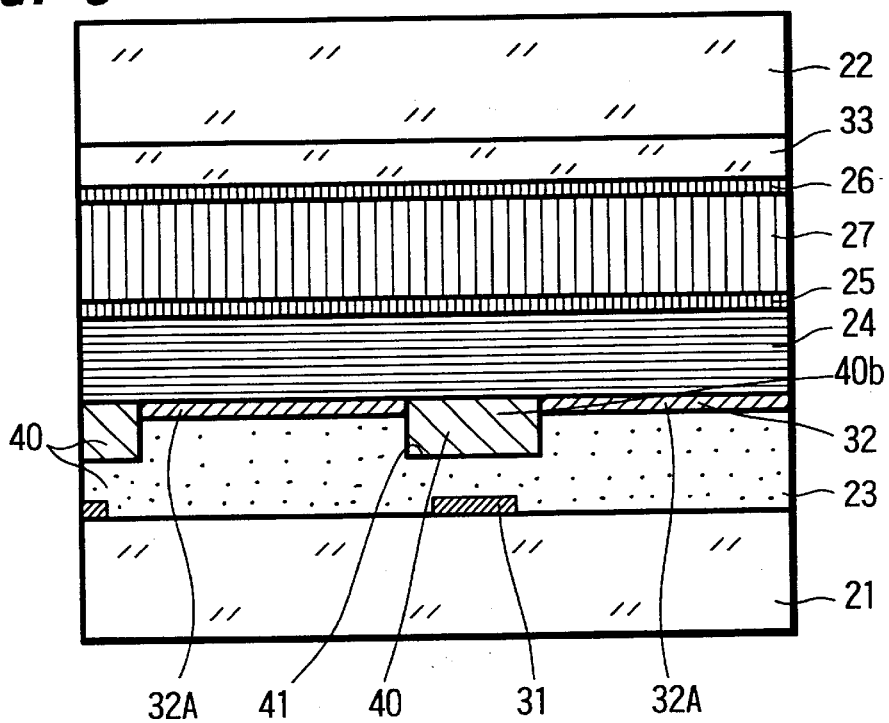
FIG. 5 is a schematic sectional view showing the main section of the optical writing type liquid crystal light valve apparatus of the present invention as another example.

FIGS. 4 and 5 show the case where in the structure of FIG. 3, the electric charge diffusion restricting area 40 is formed between sections corresponding to the respective pixel sections, for example, namely, as shown in the drawings, between the split electrode sections 32A.

In the example of FIG. 4, an electric charge trap area 40a which is embedded into a portion of the thickness of the photoconductive layer 23 is formed selectively between the split electrode sections 32A on the side of the photoconductive layer 23 where the second electrode 32 is formed. The electric charge diffusion restricting area 40 is formed by the electric charge trap area 40a itself and a portion whose substantial thickness becomes small due to the forming of the area 40a.

In addition, in the example of FIG. 5, a concave section 41 is formed on the photoconductive layer 23 between the split electrode sections 32A, and an insulating layer 40b is formed thereinto so that the substantial thickness of that portion of the photoconductive layer 23 is smaller than that of the other portions. The insulating layer used for forming the electric charge restricting area 40 can be formed, for example, by oxidation or by nitriding treatment by means of plasma enhancement.

In this case, for example, after a conductive layer made of the aforementioned metallic layer composing the second electrode 32 is deposited over the whole surface of the photoconductive layer 23, the conductive layer is pattern etched into a plurality of the split electrode sections 32A. Thereafter, the photoconductive layer 23 under the portion where the etching was executed is etched into a predetermined depth so that the concave section 41 is formed. The whole surface including the concave sections 41 is subject to oxidation or nitriding treatment using plasma enhancement so that the insulating layer made of $SiO_2$ or SiN is formed, and the insulating layer is etched back to be flattened by chemical machine polishing, i.e., so-called CMP. The insulating layer 40b which was embedded into the concave section 41 forms a surface which is flush with the second electrode 32. Namely, the insulating layer 40b is embedded in the concave section 41 limitedly.

According to the structures of FIG. 4 and 5, since the electric charge diffusion restricting area 40, which displays the effects obtained by the structures of FIGS. 3 and 4 and avoids giving and receiving of the electric charges on the photoconductive layer, is provided at a portion corresponding to the portion between the pixels, for example, a predetermined voltage is applied to each of the pixels independently. As a result, the contrast and resolution are improved.

Here, in FIGS. 4 and 5, the same reference numerals are given to the parts corresponding to those in FIGS. 3 and 4, and the description thereof is omitted.

In the examples shown in FIGS. 3 through 5, the whole surface of the split electrode sections 32A comes in contact with the photoconductive layer 23, but as shown in FIGS. 6 through 12, the split electrode section 32A can be arranged substantially along the surface direction of the liquid crystal layer 27, namely, the split electrode section 32A can be formed by an opposing electrode section 32f, which face the third electrode 33 across the liquid crystal layer 27, and a contact section 32c, which is extended in the vertical direction and comes in contact with the photoconductive layer 23.

In this case, an inter-layer insulating layer 42 made of $SiO_2$, SiN or the like is formed between the photoconductive layer 23 and the reflective layer 24, and the opposing electrode section 32f of the second electrode 32 contacts with the inter-layer insulating layer 42 on the side of the reflective layer 24. The contact section 42c pierces through the inter-layer insulating layer 42 in its thickness-wise direction so as to electrically contact with the photoconductive layer 23.

In this case, as shown in FIGS. 6 through 10, each of the split electrode sections 32A of the second electrode 32 can be formed so as to have a T-shaped section where its contact section 32c is extended in the vertical direction from the center of the opposing electrode sections 32f or a position shifted from the center. In another manner, as shown in FIG. 11, the split electrode section 32A can be formed so as to have an L-shaped section where the contact section 32c is extended from one side of the opposing electrode section 32f. Moreover, though not shown, the section of each of the split electrode sections 32A can have a U shape and another various kinds of shapes.

In each of the split electrode sections 32A of the second electrode 32, an contact area of the contact section 32c with the photoconductive layer 23 is set so as to be sufficiently smaller than an area of the opposing electrode section 32f.

In the method of forming the second electrode 32, a column-shaped contact hole 42H is formed so as to pierce through the inter-layer insulating layer 42 by pattern-etching or the like using photo-lithography, and W (tungsten), for example, is deposited selectively into the contact hole 42H so that the contact hole 42 is filled with a conductive layer. The column-shaped contact section 32c whose lower end of the conductive layer electrically contacts with the photoconductive layer 23, is formed for each of the pixels, for example. Thereafter, a metallic layer made of W, Cr, Al or the like is clad on the whole surface by vacuum evaporation, sputtering or the like so as to be connected with the upper end of the contact section 32c, and is pattern etched by photo-lithography. Then, each of the opposing electrode sections 32f, which electrically contact with the contact sections 32c, is separately formed.

Figure 6:
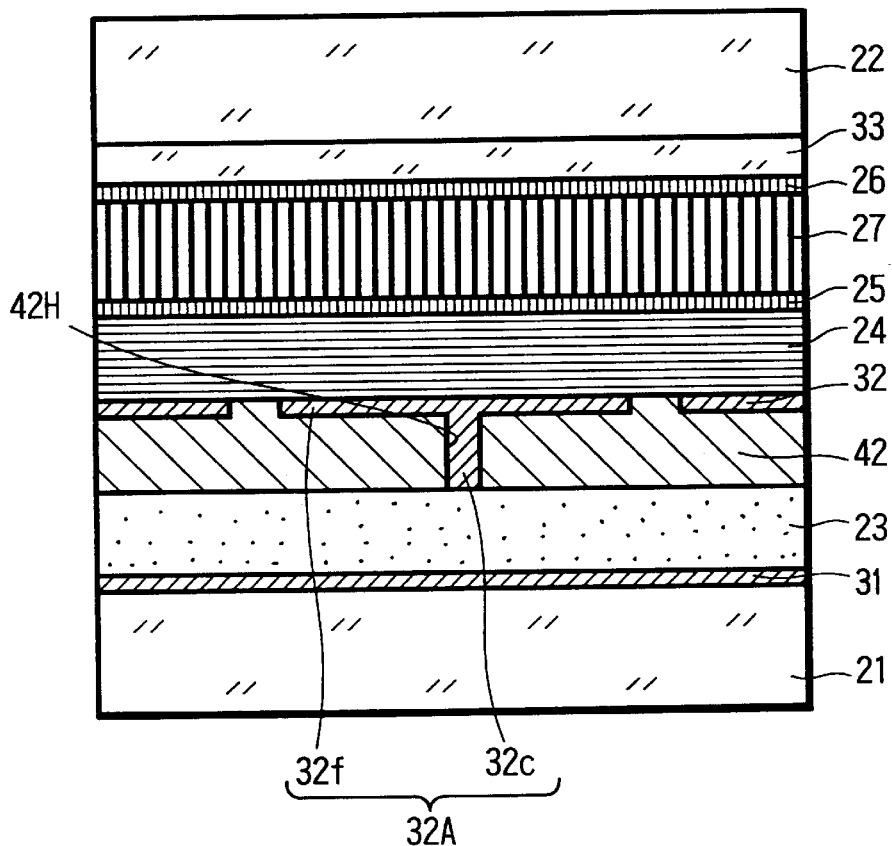
FIG. 6 is a schematic sectional view showing the main section of the optical writing type liquid crystal light valve apparatus of the present invention as another example.
Figure 7:
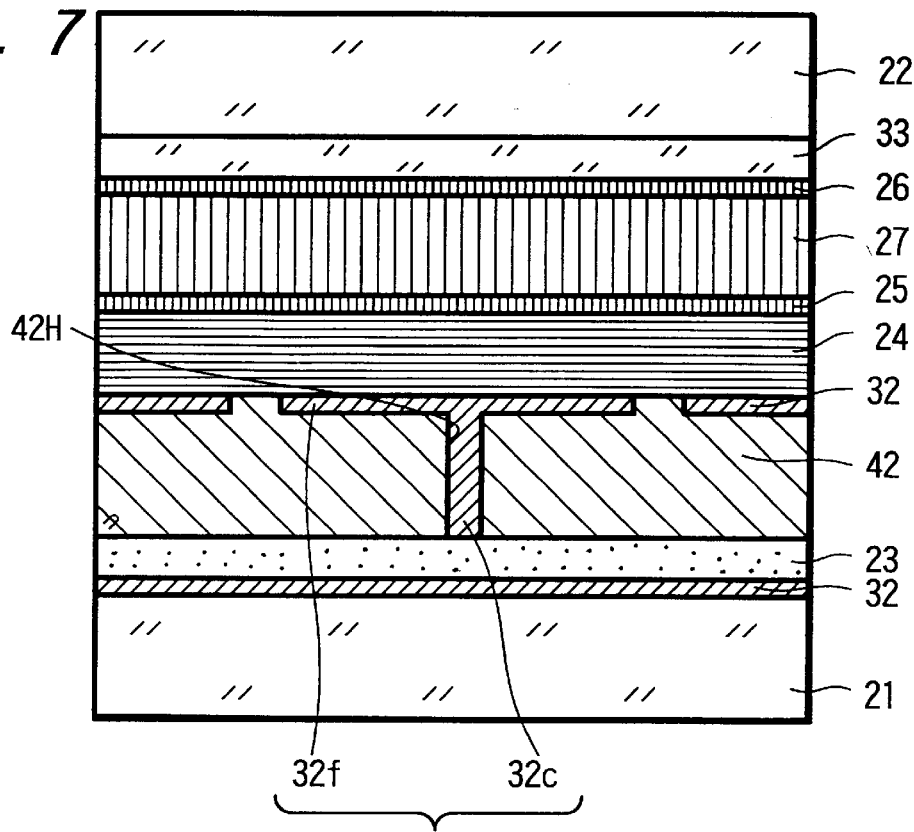
FIG. 7 is a schematic sectional view showing the main section of the optical writing type liquid crystal light valve apparatus of the present invention as another example.
Figure 22:
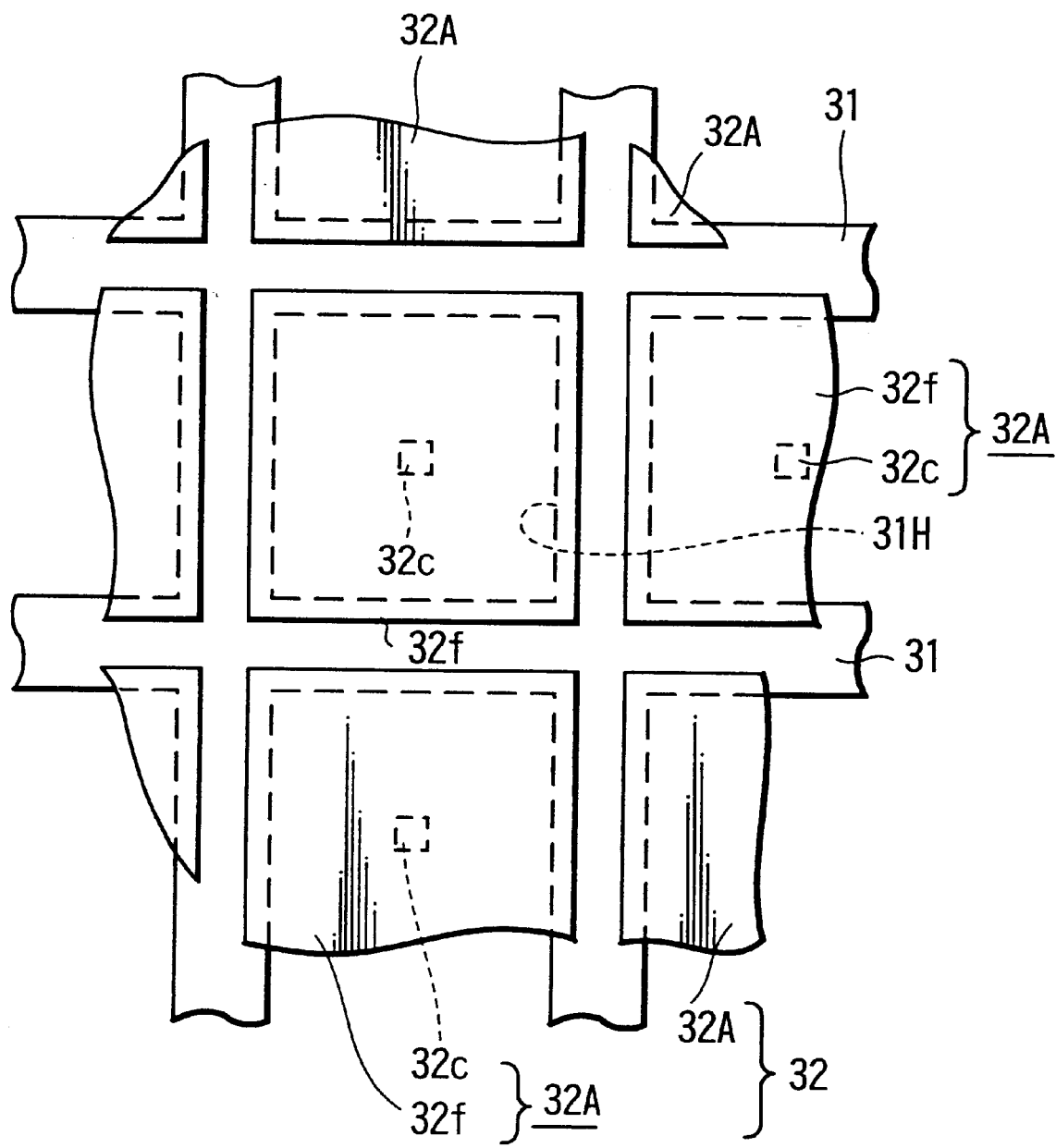
FIG. 22 is a schematic plan view showing the main section of the apparatus of the present invention taken along line A—A of FIG. 9.

In the examples shown in FIGS. 6 and 7, the first electrode 31 made of a transparent electrode is formed on the whole surface. In the examples of FIGS. 8 through 11, openings 31H are formed in the first electrode 31, and the first electrode 31 is formed into a matrix pattern or parallel strip pattern. FIG. 22 is a schematic plan view showing a main section taken along line A—A of FIG. 9, and in this example, the first electrode 31 is formed into a matrix or lattice pattern.

Figure 8:
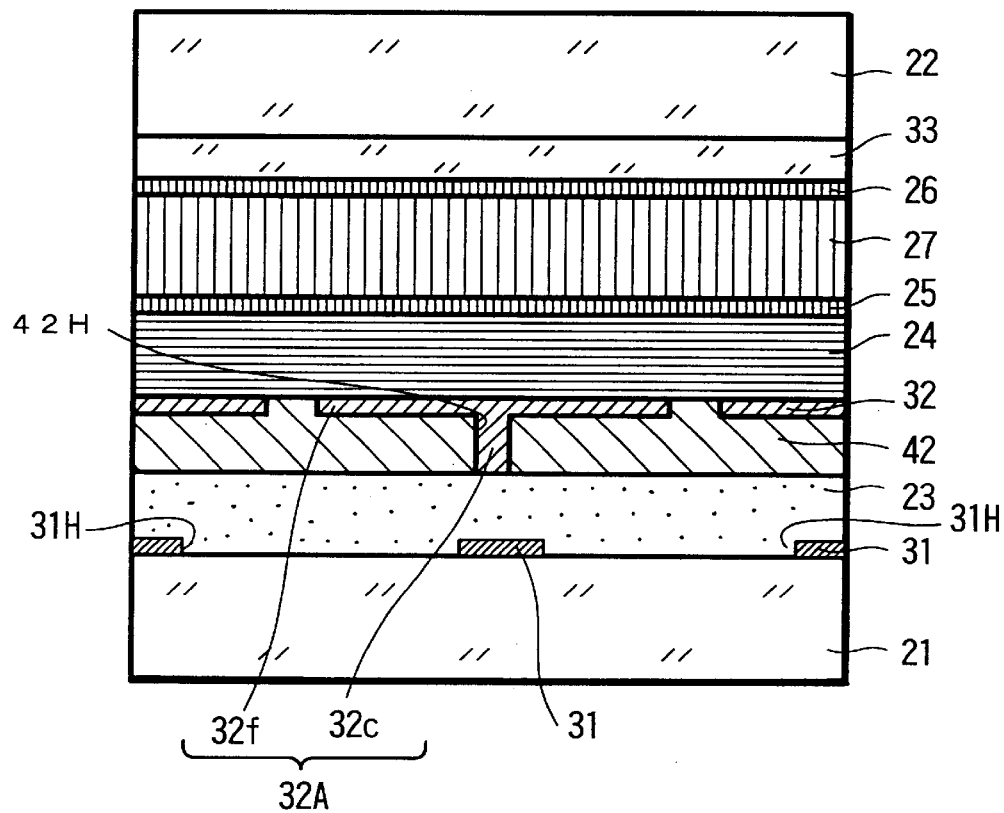
FIG. 8 is a schematic sectional view showing the main section of the optical writing type liquid crystal light valve apparatus of the present invention as another example.

In the example of FIG. 8, the matrix or parallel strip pattern portion of the first electrode 31 is arranged so that at least its one portion faces the portion between the contact sections 32c across the photoconductive layer 23 (face each other on the front sides in the drawing). In the examples shown in FIGS. 9 and 22 and in the example shown in FIG. 10, the matrix or strip pattern portion of the first electrode 31 is arranged so that at least its one portion faces the portion between the opposing electrode sections 32f of the second electrode 32 (face each other on the front sides in the drawing). In these structures, the pattern of the first electrode 31 can be formed so that a width of the opposing portion with the contact section 32c of the second electrode 32 is larger than the other portions.

Further, in the example of FIG. 11, the matrix portions between the openings 31H of the first electrode 31 face the opposing electrode sections 32f of the second electrode 32.

In the examples of FIGS. 6, 7 and 8, the first electrode 31 faces the split electrode section 32A of the second electrode 32, but in any example, as for the substantial opposing area across the photoconductive layer 23, since the contact section 32c is made to have a small area, electrostatic capacity therebetween becomes small.

In FIGS. 6 and 7, since the first electrode 31 is formed on the whole surface, the process of forming the electrode 31 can be simplified because the patterning using photo-lithography having a large number of steps is not executed. Accordingly, even when the first electrode 31 is formed on the whole surface in such a manner, the area of the contact section 32c of the second electrode 32 which directly contacts with the photoconductive layer 23 becomes small, and thus the electrostatic capacity between the first electrode and the second electrode, namely, the electrostatic capacity relating to the photoconductive layer can be reduced.

However, even in this case, as shown in FIG. 8, when the first electrode 31 is formed into the matrix pattern, for example, so as to face the portion of the second electrode 32, the electrostatic capacity relating to the photoconductive layer can be further reduced.

Figure 9:
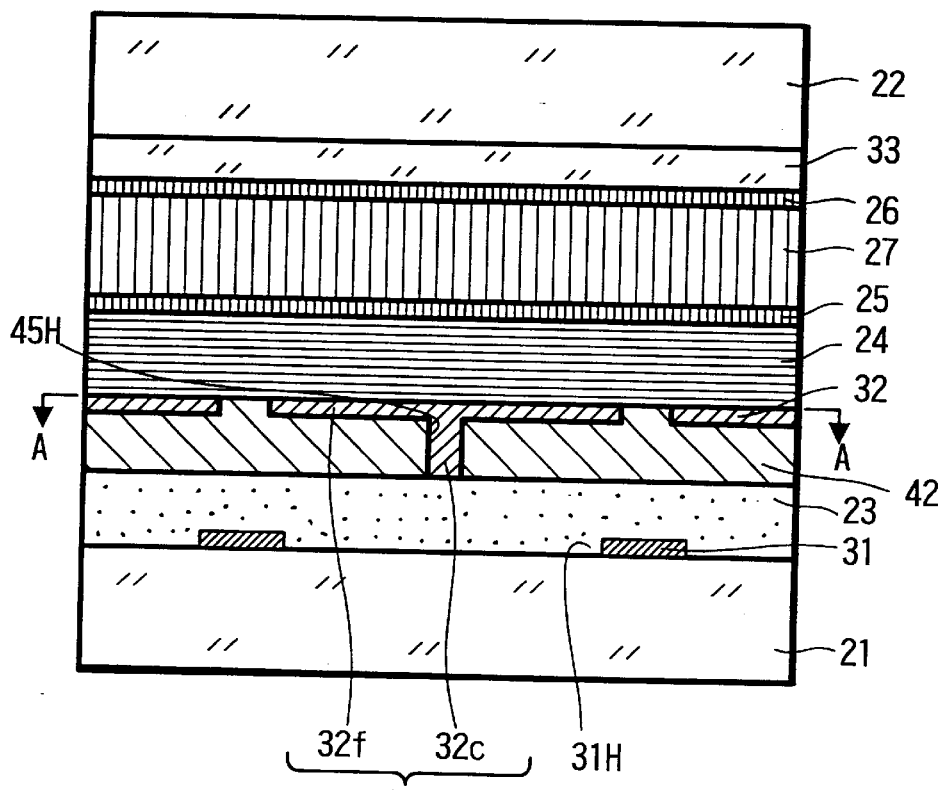
FIG. 9 is a schematic sectional view showing the main section of the optical writing type liquid crystal light valve apparatus of the present invention as another example.
Figure 10:
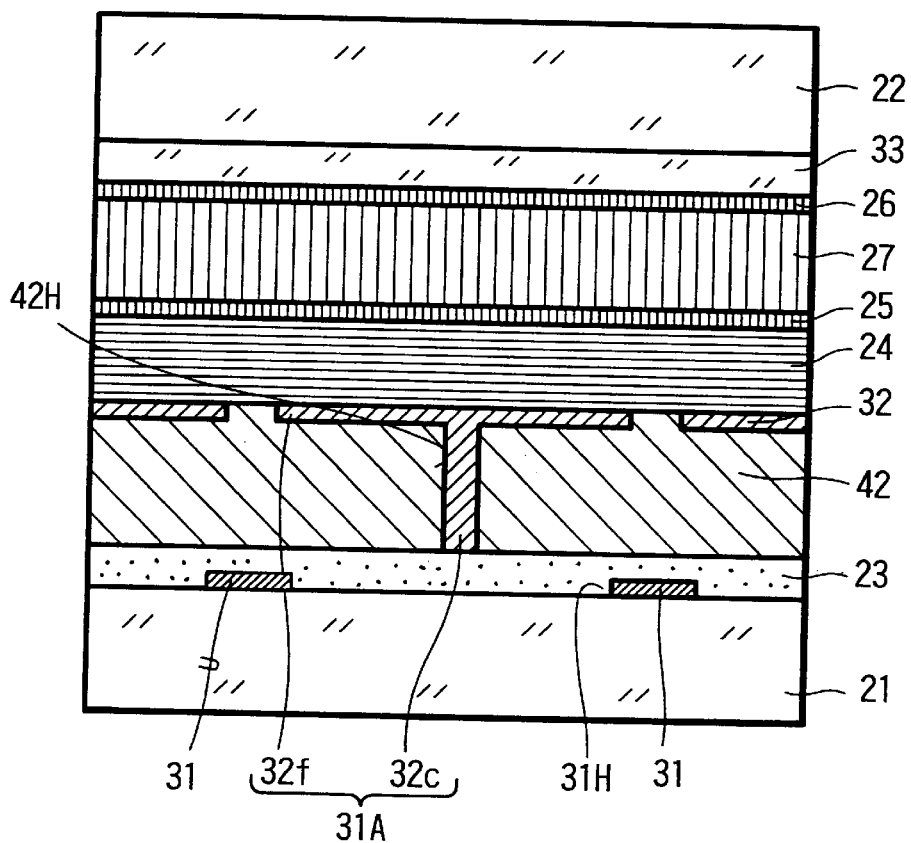
FIG. 10 is a schematic sectional view showing the main section of the optical writing type liquid crystal light valve apparatus of the present invention as another example.
Figure 11:
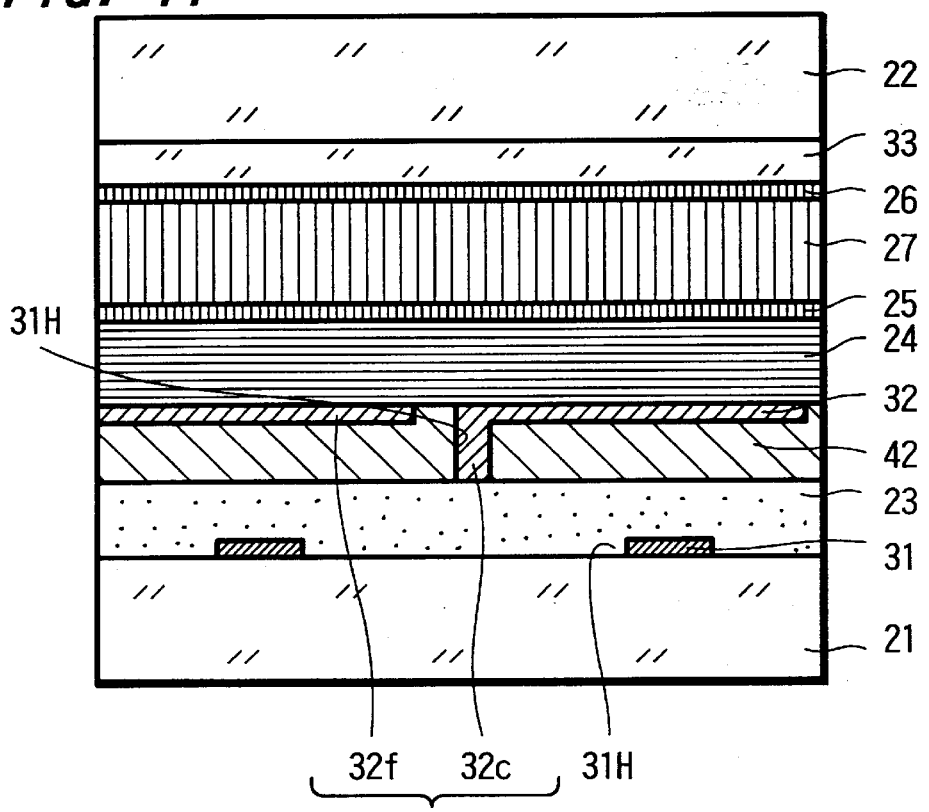
FIG. 11 is a schematic sectional view showing the main section of the optical writing type liquid crystal light valve apparatus of the present invention as another example.

In addition, in the examples of FIGS. 9 and 10, the first electrode 31 is arranged in a position where it does not face the contact section 32c of the split electrode section 32A of the second electrode 32. In this case, since a distance between the first electrode 31 and the contact section 32c of the split electrode section 32A of the second electrode 32 across the photoconductive layer 23 can be made large, the electrostatic capacity relating to the photoconductive layer can be reduced. As a result, the thickness of the photoconductive layer 23 itself can be small more easily.

Moreover, in the structure of FIG. 10 similar to that of FIG. 9, when the thickness of the inter-layer insulating layer 42 is enlarged, the interval between the first electrode 31 and the opposing electrode section 32f of the second electrode 32 is sufficiently large. As a result, the capacity is further reduced, and the thickness of the photoconductive layer 23 is reduced.

In those cases shown in FIGS. 6 through 11, since the capacity relating to the photoconductive layer 23 can be reduced substantially, accordingly the thickness of the photoconductive layer 23 can be small by that amount. Since this thickness can be thinned easily up to about 1 to 2 μm that is required for the absorption of the writing light, the diffusion of the electric charges can be avoided efficiently, and thus the contrast and resolution can be improved.

In FIGS. 6 through 11, the same reference numerals are given to the parts corresponding to those in FIGS. 3 through 5, and the overlapped description thereof is omitted.

Figure 12:
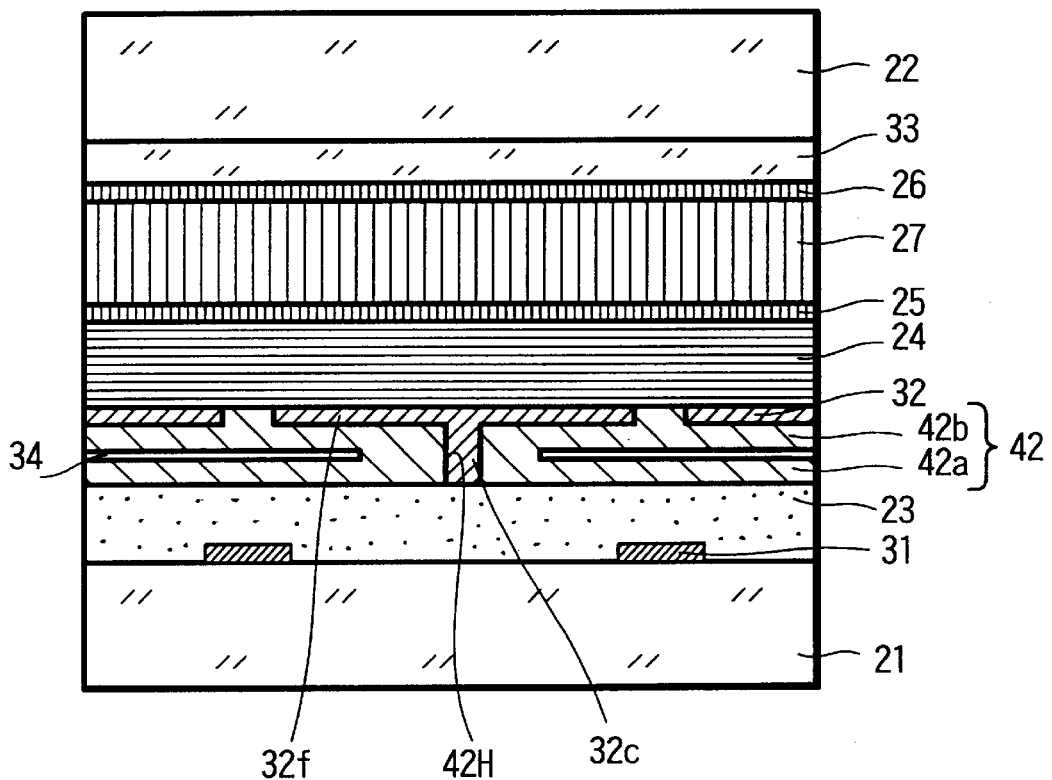
FIG. 12 is a schematic sectional view showing the main section of the optical writing type liquid crystal light valve apparatus of the present invention as another example.

In addition, in the example shown in FIG. 12, similarly to the structures shown in FIGS. 9 and 10, the first electrode 31 is arranged so as to face the portions between the split electrode sections 32A of the second electrode 32. Further, a fourth electrode 34 is arranged between the first and second electrodes 31 and 32.

The electrode 34 is composed of a conductive layer which is arranged in a middle portion of the thickness direction of the inter-layer insulating layer 42. The fourth electrode 34 has an electric potential same as that of the third electrode 33. To this end, the third and fourth electrodes 33 and 34 are electrically connected with each other inside or outside the optical writing type liquid crystal light valve apparatus, for example.

In this case, the fourth electrode 34 is formed in such a manner that after the photoconductive layer 23 is formed, a lower insulating layer 42a composing the inter-layer insulating layer 42 is formed thereon so as to have a predetermined thickness. A metallic layer made of W, Cr, Al or the like is formed on the whole surface of the lower insulating layer by vacuum evaporation, sputtering or the like, and the metallic layer is pattern etched by photo-lithography so that the fourth electrode 34 having a predetermined pattern is formed. Further, an upper insulating layer 42b is formed so as to cover the fourth electrode 34, and the inter-layer insulating layer 42 is formed by the lower and upper insulating layers 42a and 42b.

It is preferable that the fourth electrode 34 is formed so as to face the whole interval between the opposing electrode sections 32f of the adjacent split electrode sections 32A of the second electrode 32 and so as to have an area which is large enough to enter portions under the opposing electrode sections 32f of the second electrode 32.

In the optical writing type liquid crystal light valve apparatus where the fourth electrode 34 is formed, since the fourth electrode 34 which has a potential same as that of the third electrode 33 intervenes between the first electrode 31 and the third electrode 33, capacity formed between the first and fourth electrodes 31 and 34 across the inter-layer insulating layer 42 is added to the normal capacity formed across the liquid crystal layer 27. As a result, the capacity relating to the liquid crystal layer is substantially increased.

Therefore, according to the structure of FIG. 12, since the capacity relating to the liquid crystal layer is balanced with the capacity relating to the photoconductive layer, the capacity of the photoconductive layer can be increased by the capacity of the liquid crystal layer. As a result, the photoconductive layer 23 can be further thinned.

In addition, in this case, since the opposing electrode sections 32f of the second electrode 32 which become one electrode of the liquid crystal layer 27 are shielded by the fourth electrode 34, the length of the contact section 32c and the thickness of the inter-layer insulating layer 42 are reduced so that a TAT (Turn Around Time) can be shortened and the yield can be improved.

In addition, in this case, since the fourth electrode 34 is arranged so as to face the intervals between the opposing electrodes 32f of the split electrode sections 32A of the second electrode 32, the fourth electrode 34 can serve as a light shielding layer which avoids even a slight amount of light which transmits through the reflective layer 24, namely, prevents the writing light LW from the first transparent substrate 21 side from being observed from the second transparent substrate 22 side, and the reading light LR from the second transparent substrate 22 side from reaching the photoconductive layer 23. As a result, the contrast can be improved. Therefore, in this structure, the above-mentioned writing light LW and reading light LR can be securely prevented from transmitting without providing the light shielding layer 4 composed of a CdTe layer described in FIG. 1. As a result, the producing process and producing apparatus can be simplified, and the environmental problem can be improved by avoiding the handling of the CdTe as an injurious material.

In addition, in this case, since the fourth electrode 34 is formed with a large width so as to enter the portion under the opposing electrode sections 32f of the second electrode 32, the allowance for the positioning becomes large.

In each of the above-mentioned examples, the first and second electrodes 31 and 32 are arranged so as to sandwich the photoconductive layer 23, but as shown in FIGS. 13 through 19, for example, the first and second electrodes 31 and 32 can be arranged on the side of the photoconductive layer 23 opposite to the first substrate 21, namely, a common main surface on the liquid crystal layer 27 side, namely, on the same surface side (hereinafter, first main surface 23S).

Figure 13:
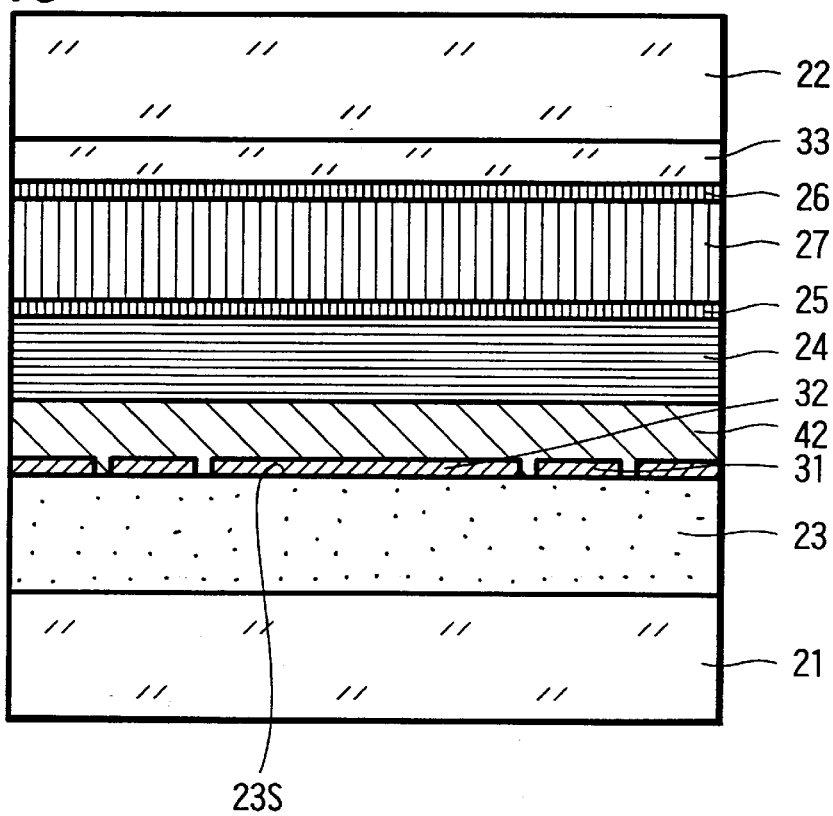
FIG. 13 is a schematic sectional view showing the main section of the optical writing type liquid crystal light valve apparatus of the present invention as another example.

In the structure of FIG. 13, a-Si, for example, is deposited directly on the first substrate 21 by the aforementioned method so that the photoconductive layer 23 is formed. The first and second electrodes 31 and 32 are formed on the photoconductive layer 23 in parallel. The first and second electrodes 31 and 32 are formed in such a manner that a metallic layer made of W, Cr, Al or the like is formed on the whole main surface 23S of the photoconductive layer 23, for example, by sputtering, vacuum evaporation or the like. Then, the metallic layer is pattern etched by photolithography, the second electrode 32, which is composed by arranging the split electrode sections 32A corresponding to the respective pixels, is formed and simultaneously the first electrode 31 with a matrix pattern, for example, is formed in the gaps between the split electrode sections 32A so as to provide a predetermined interval from the split electrode sections 32A. Thereafter, the inter-layer insulating layer 42 is formed so as to fill up the interval between the first and second electrode 31 and 32 and to cover the electrodes 31 and 32.

In the structure of FIG. 13, since the first and second electrodes 31 and 32 are formed in parallel on the photoconductive layer 23, the electrodes 31 and 32 face each other at small area portions of the respective end surfaces thereof. Moreover, since the electrodes 31 and 32 face each other across the photoconductive layer 23 along the surface direction of the photoconductive layer 23, the opposing distance therebetween via the photoconductive layer 23 becomes substantially longer, and thus the capacity relating the photoconductive layer becomes small. Therefore, in the case of this structure, the thickness of the photoconductive layer 23 can be reduced.

Further, in this structure, the voltage applied to the first electrode 31, namely a power-supply voltage to the liquid crystal layer 27 generates a potential barrier against the diffusion of the electric charges in the surface direction generated in the photoconductive layer 23. As a result, the diffusion of the electric charges in the photoconductive layer 23 can be avoided more efficiently.

Here, in FIG. 13, the same reference numerals are given to the parts corresponding to those in FIGS. 3 through 12, and the overlapped description thereof is omitted.

In addition, in each of the examples shown in FIGS. 14 through 18, the first and second electrodes 31 and 32 are arranged on the main surface 23S on the opposite side of the photoconductive layer 23 to the substrate 21. However, in these examples, similarly to the aforementioned example, the second electrode 32 has a structure of a T-shaped section, for example, which is composed of the opposing electrode section 32f and the contact section 32c. The contact section 32c of the second electrode 32 contacts with the main surface 23S of the photoconductive layer 23.

Figure 14:
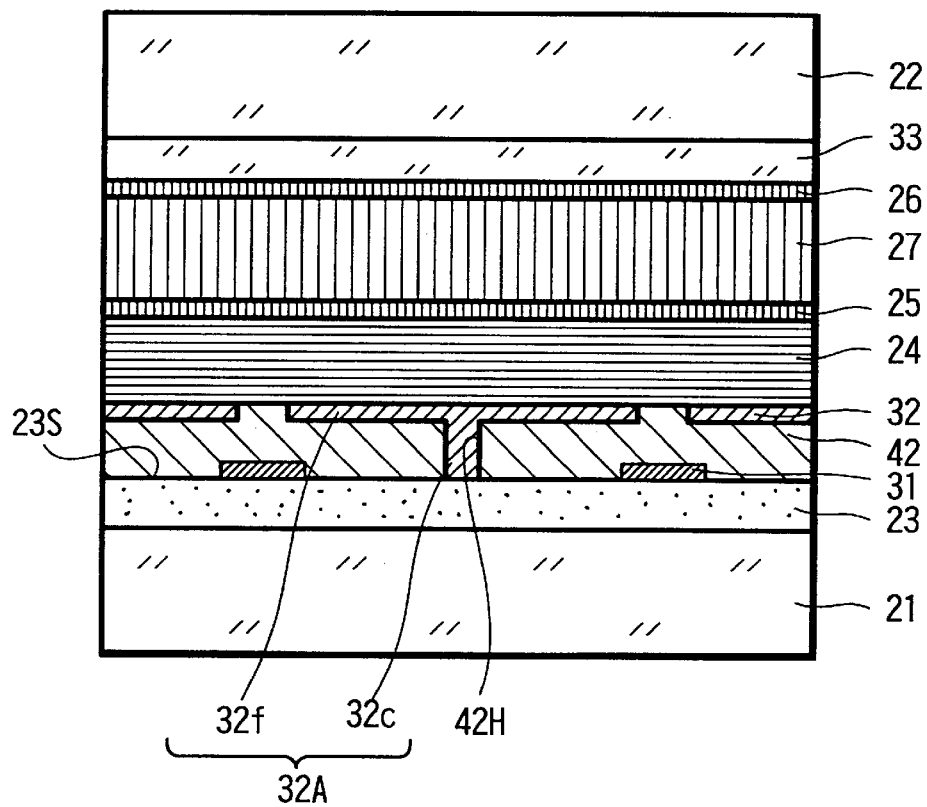
FIG. 14 is a schematic sectional view showing the main section of the optical writing type liquid crystal light valve apparatus of the present invention as another example.

Namely, in the example of FIG. 14, after the photoconductive layer 23 is formed on the first transparent substrate 21 in the manner similar to the above-mentioned one, an oxide film, which was formed on the surface of the photoconductive layer 23 made of a-Si, for example, by natural oxidation, si removed or if this is thin enough, this oxide film is not removed so that the metallic layer is formed on the whole main surface 23S on the front side. Then, the first electrode 31 with a matrix pattern, for example, is formed by pattern etching the metallic layer by means of photolithography, for example. At this time, the metallic layer composing the first electrode 31 can be left on a portion which is surrounded by the matrix-patterned first electrode 31 where the contact section 23c of the second electrode 32 with the photoconductive layer 23 is formed.

Thereafter, the inter-layer insulating layer 42 and the second electrode 32 are formed by the method same as those in FIGS. 6 through 11.

In any cases of FIGS. 14 through 18, since the first electrode 31 and the contact sections 32c of the second electrode 32 are arranged on the photoconductive layer 23, similarly to the example of FIG. 13, the first and second electrodes 31 and 32 face each other via the photoconductive layer 23 along the surface direction of the photoconductive layer 23. The substantial opposing distance becomes long, and thus the capacity relating to the photoconductive layer 23 becomes small. Therefore, in this structure, the thickness of the photoconductive layer 23 can be reduced, and thus similarly to the aforementioned examples, the diffusion of the electric charges in the photoconductive layer 23 can be avoided efficiently.

Figure 15:
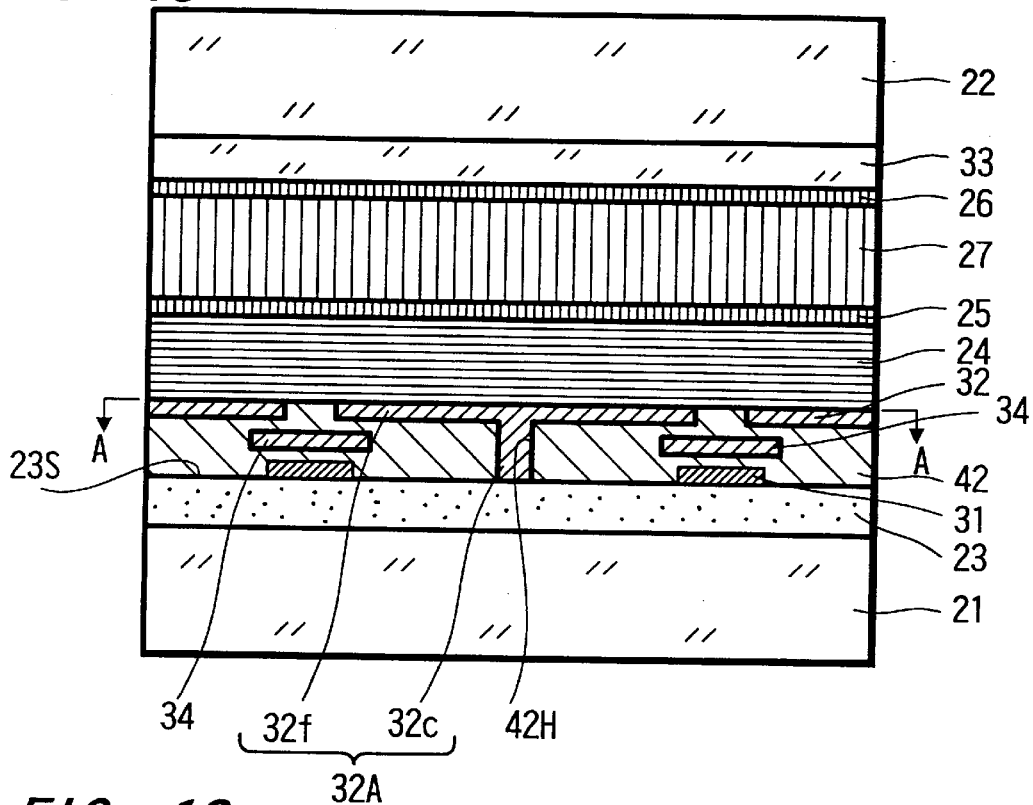
FIG. 15 is a schematic sectional view showing the main section of the optical writing type liquid crystal light valve apparatus of the present invention as another example.
Figure 16:
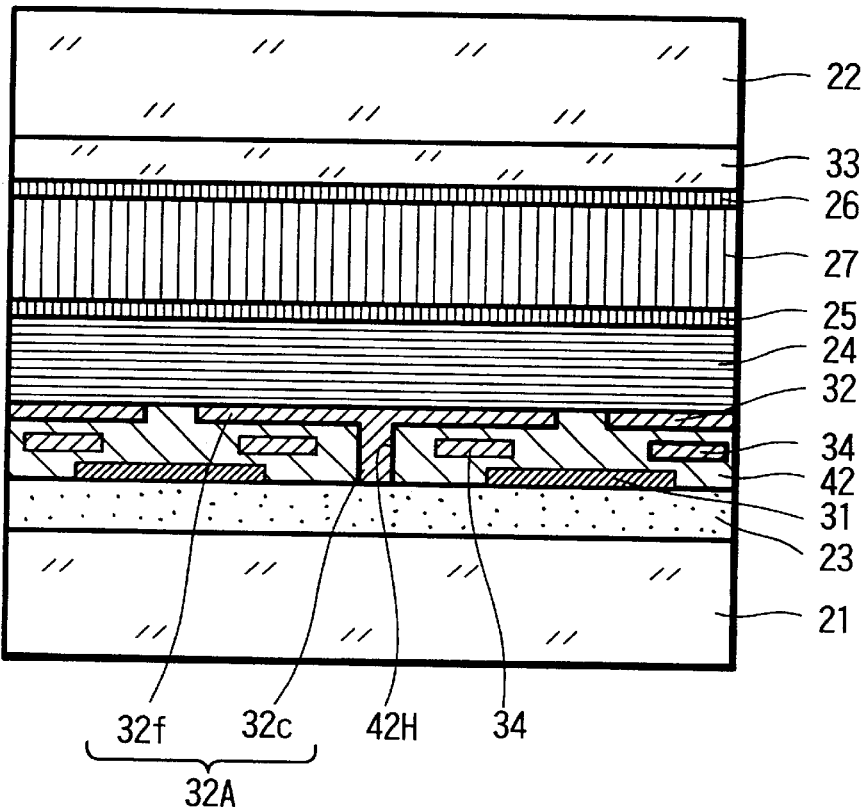
FIG. 16 is a schematic sectional view showing the main section of the optical writing type liquid crystal light valve apparatus of the present invention as another example.

In the examples of FIGS. 14 through 16, the first electrode 31 is arranged in positions that face the gaps between the opposing electrode sections 32f of the split electrode sections 32A of the second electrode 32. When the first and second electrodes 31 and 32 are composed of a metallic layer, for example, which does not have light transparency, their cooperation securely shields a slight amount of light via the reflective layer 24, namely, the writing light LW transmitting to the second transparent substrate 22 or the reading light LR transmitting through the photoconductive layer 23 even if the shielding layer made of a CdTe layer is omitted similarly to the example of FIG. 13. As a result, the problem of the contrast can be solved. Since the formation of the toxic light shielding layer made of CdTe can be avoided, the environmental problem can be improved.

In addition, in the apparatus of the present invention, the fourth electrode can be arranged between the surface of the second electrode 32 where the opposing electrode sections 32f are provided and the photoconductive layer 23.

In the example of FIG. 15, after the photoconductive layer 23 made of a-Si is deposited on the first transparent substrate 21 by the CVD method, for example, the first electrode 31 with a matrix pattern, for example, in which the opening 31H is formed therethrough, is formed thereon by forming a metallic layer or pattern etching by means of photo-resist. Similarly to the description in FIG. 12, the fourth electrode 34 is formed in a middle portion of the thickness direction of the inter-layer insulating layer 42 by the same method as that in FIG. 12, and the second electrode 32 having the opposing electrode sections 32f and the contact sections 32c is formed in the manner same as that of FIG. 12.

Figure 23:
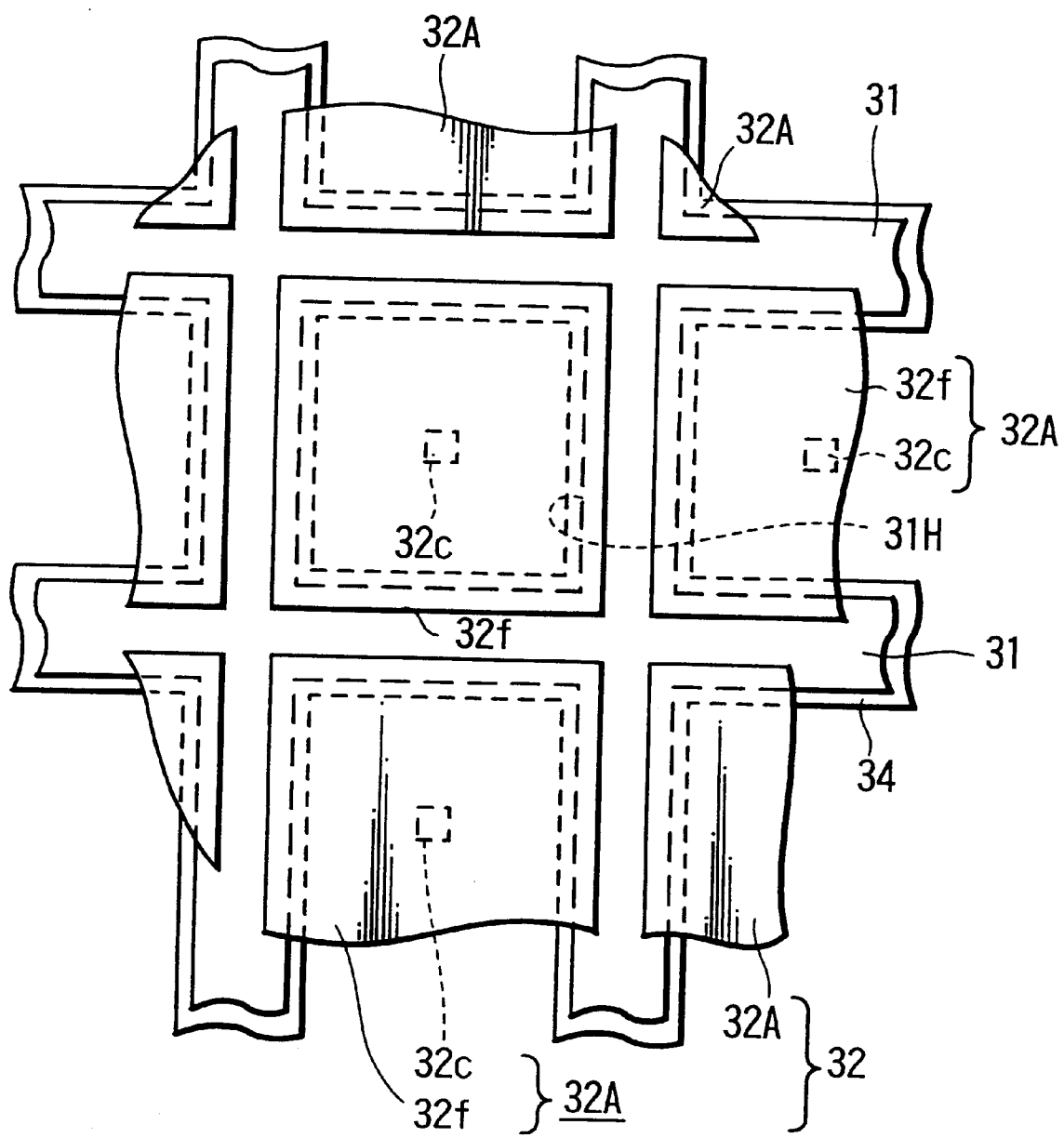
FIG. 23 is a schematic plan view showing the main section of the apparatus of the present invention taken along line A—A of FIG. 15.

FIG. 23 shows the schematic plan view of this example. The fourth electrode 34 is arranged into a lattice or matrix pattern so as to face and cover the whole width of the gaps between the adjacent opposing electrode sections 32f of the second electrode 32. The matrix portions of the first electrode 31 are set so as to have a width and position where the second electrode 32 covers the matrix portions.

Furthermore, in this case, the fourth electrode 34 has an electric potential same as that of the third electrode 33.

In FIGS. 15 and 23, the same reference numerals are given to the parts corresponding to those in FIGS. 3 through 14, and the overlapped description thereof is omitted.

The optical writing type liquid crystal light valve apparatus of FIG. 15 has the effect described in FIG. 14 as well as the effect of the increase in the capacity due to the provision of the fourth electrode 34 similar to that described in FIG. 12, the effect of the reduction in the thickness of the photoconductive layer 23 and the function of the fourth electrode 34 as a light shielding layer.

Figure 1:
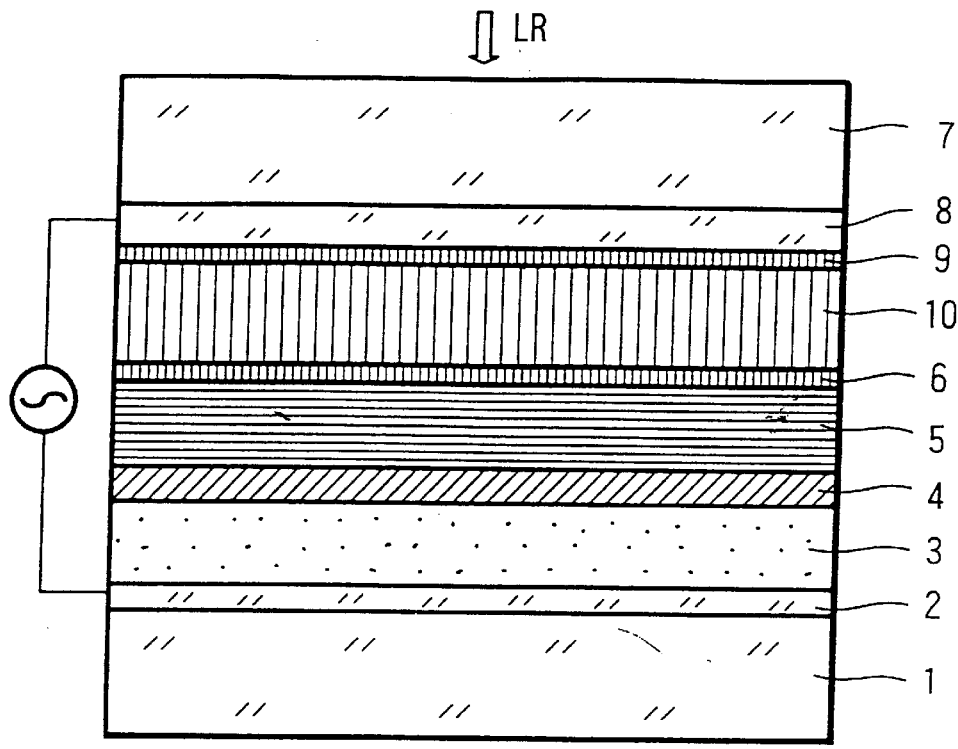
FIG. 1 is a schematic sectional view showing a main section of a conventional optical writing type liquid crystal light valve apparatus.
Figure 2:
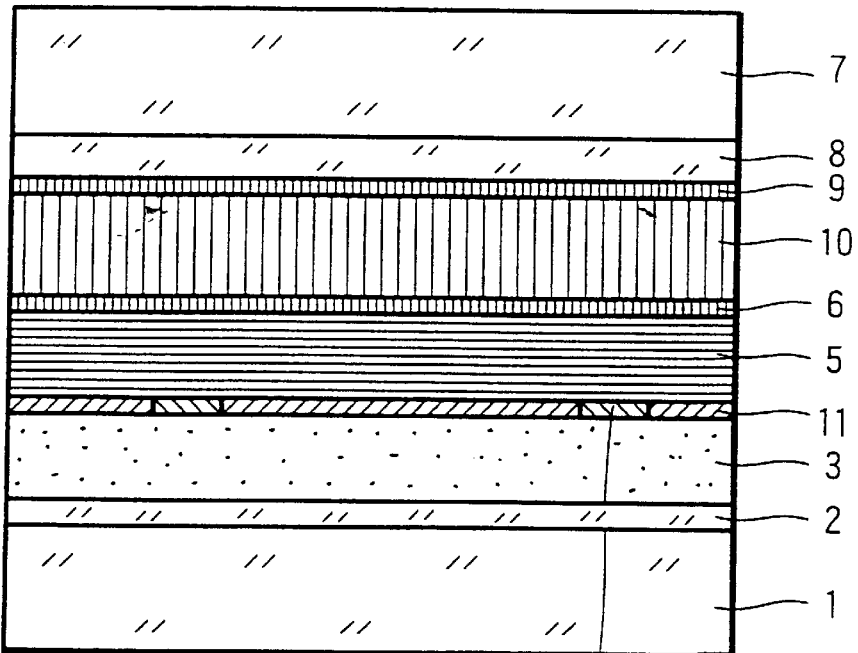
FIG. 2 is a schematic sectional view showing a main section of a conventional optical writing type liquid crystal light valve apparatus.

In addition, in the example of FIG. 16, as shown in the schematic plan view of FIG. 1, the fourth electrode 34 is arranged at a position which surrounds the contact section 32c of the second electrode 32 so as to face the opposing electrode section 32f.

In this case, it is desirable that the first electrode 31 is arranged so as to enter the portions under the fourth electrodes 34 and to face the fourth electrodes 34.

As a result, the capacity can be increased, and the first electrode 31 can execute the function as the light shielding layer.

Also in the example of FIG. 16, the capacity relating to the photoconductive layer, which is set according to the capacity of liquid crystal, can be increased due to the provision of the fourth electrode 34, and the first electrode 31 and the contact sections 32c of the second electrode 32 are arranged in parallel on the photoconductive layer 23. As a result, the electrostatic capacity relating to the photoconductive layer 23 can be reduced, and thus its thickness can be thinned.

In FIG. 16, the same reference numerals are given to the parts corresponding to those in FIGS. 3 through 15, and the overlapped description thereof is omitted.

Figure 17:
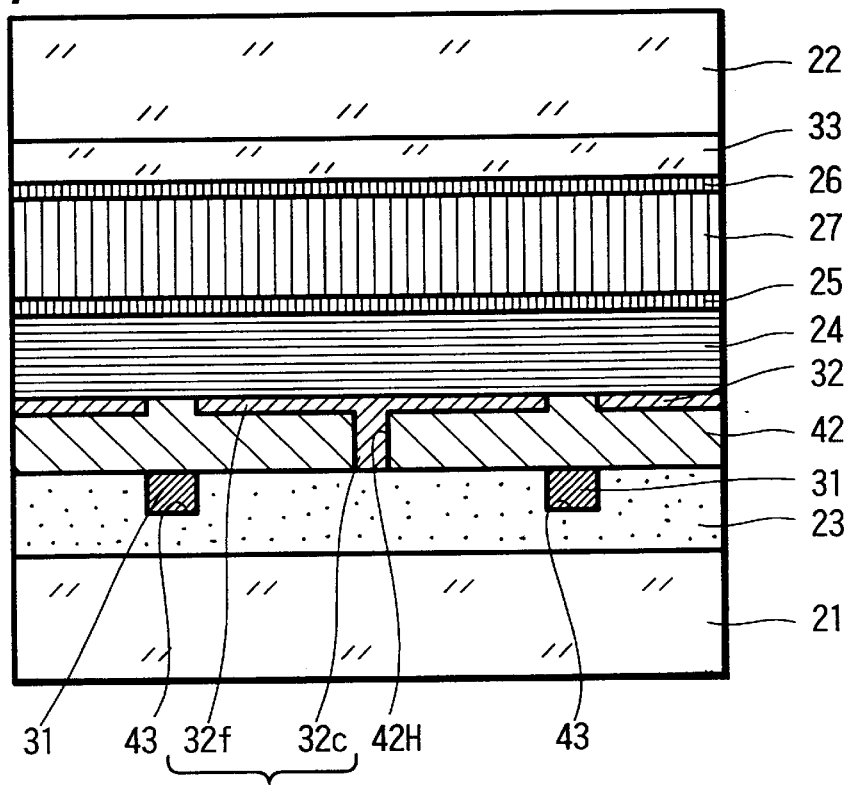
FIG. 17 is a schematic sectional view showing the main section of the optical writing type liquid crystal light valve apparatus of the present invention as another example.

In addition, in the example of FIG. 17, the first electrode 31 is embedded into the main surface 23s of the photoconductive layer 23 on the opposite side to the substrate 21. In this case, after the photoconductive layer 23 is deposited on the substrate 21, grooves 43 are formed on portions of the main surface 23s where the first electrode 31 was formed by chemical etching, RIE (reactive ion etching) or the like. The grooves 43 are filled up so that the aforementioned metallic layer composing the first electrode 31 is formed wholly, for example, and the metallic layer is etched back by CMP or the like. The first electrode 31 is formed limitedly in the grooves 43 and the whole surface is flattened, and the inter-layer insulating layer 42 and the second electrode 32 and the like are formed thereon by the method same as the aforementioned one.

In FIG. 17, the same reference numerals are given to the parts corresponding to those in FIGS. 3 through 16, and the overlapped description thereof is omitted.

Figure 18:
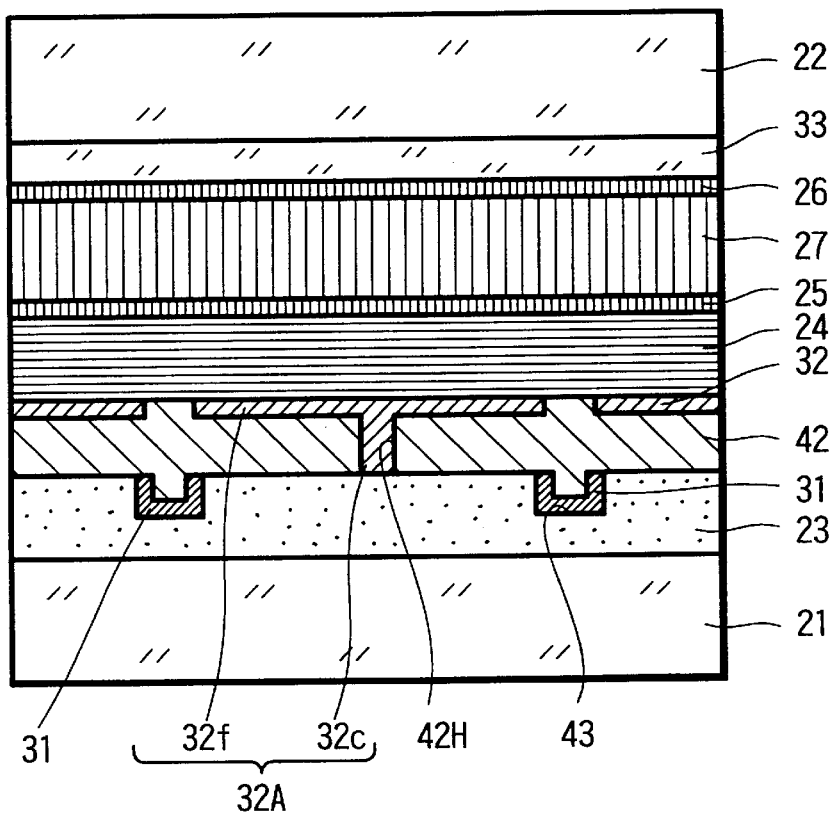
FIG. 18 is a schematic sectional view showing the main section of the optical writing type liquid crystal light valve apparatus of the present invention as another example.
Figure 19:
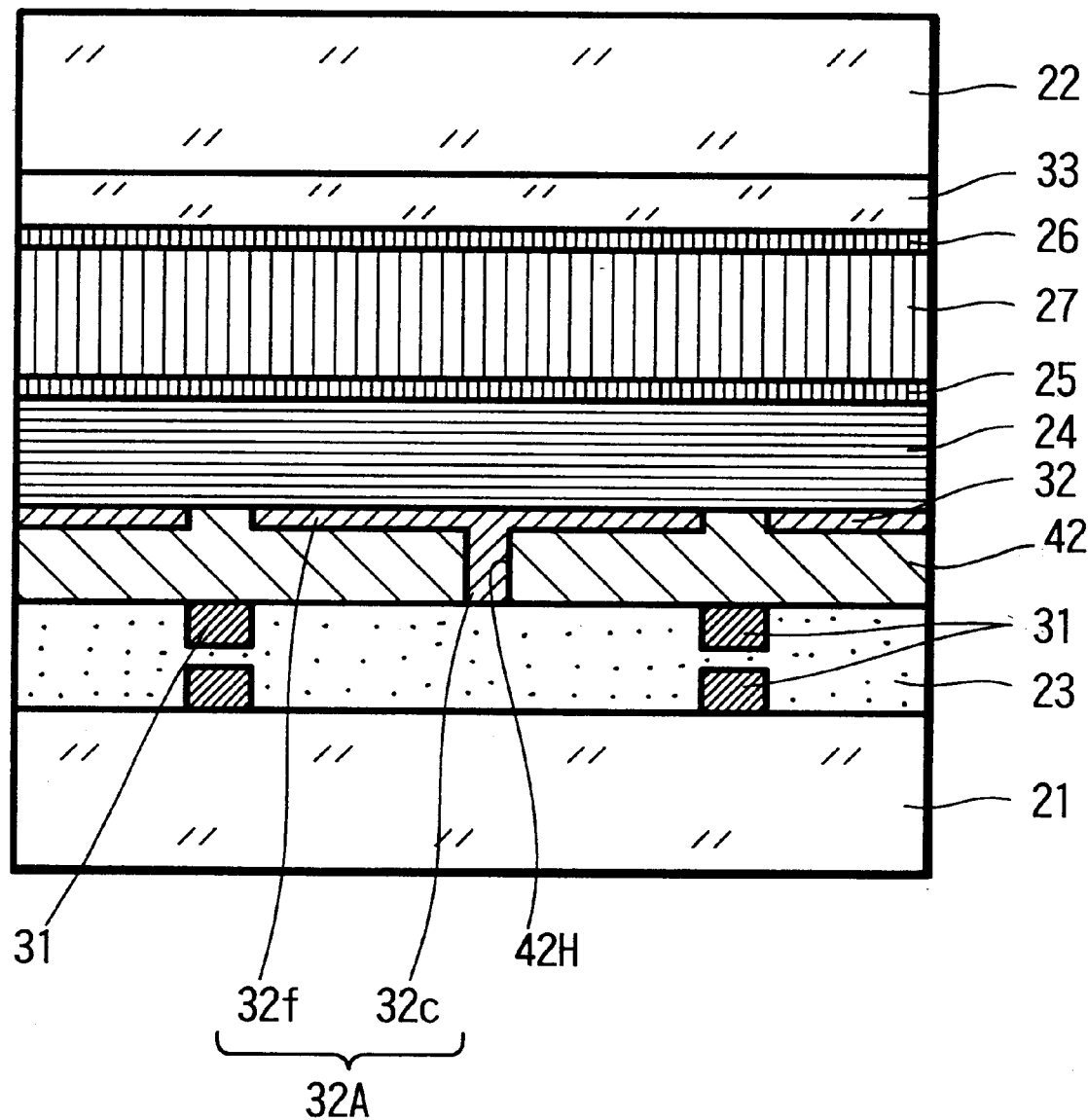
FIG. 19 is a schematic sectional view showing the main section of the optical writing type liquid crystal light valve apparatus of the present invention as another example.

In addition, according to the above method, the first electrode 31 is formed in the grooves 43 of the photoconductive layer 23 in such a manner that the grooves 43 are filled up with the metallic layer and the grooves 43 are charged with the metallic layer by the CMP method. However, as shown in FIG. 18, the metallic layer having a thickness not to charge up the grooves 43 is formed wholly on the inner periphery of the groove 43, and the metallic layer is left in the grooves 43 and the other portions of the metallic layer are etched to be removed by pattern etching or the like by means of photo-lithography. As a result, the first electrode 31 can be composed by the metallic layer left in the grooves 43. In this case, the inter-layer insulating layer 42 can be formed while being embedded into the grooves 43 where the first electrode 31 was formed.

In FIG. 18, the same reference numerals are given to the parts corresponding to those in FIGS. 3 through 17, and the overlapped description thereof is omitted.

In addition, the first electrode 31 can be formed not only on the side of the main surface 23s of the photoconductive layer 23 but also on the side of the first transparent substrate 21. In this case, prior to forming the photoconductive layer 23, the first electrode 31 is formed on the first transparent substrate 21 into a matrix pattern, for example, by forming a metallic layer on the whole surface and pattern etching by means of photo-lithography. Thereafter, the photoconductive layer 23 is formed, and the optical writing type liquid crystal light valve apparatus is formed in the similar manner to FIG. 17, for example.

Figure 20:
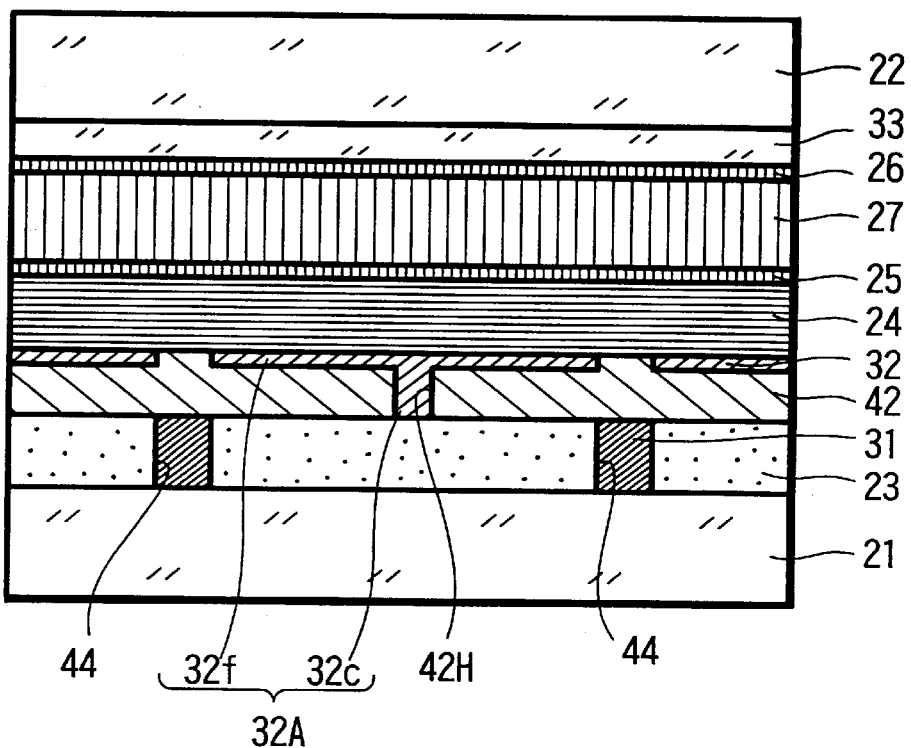
FIG. 20 is a schematic sectional view showing the main section of the optical writing type liquid crystal light valve apparatus of the present invention as another example.
Figure 21:
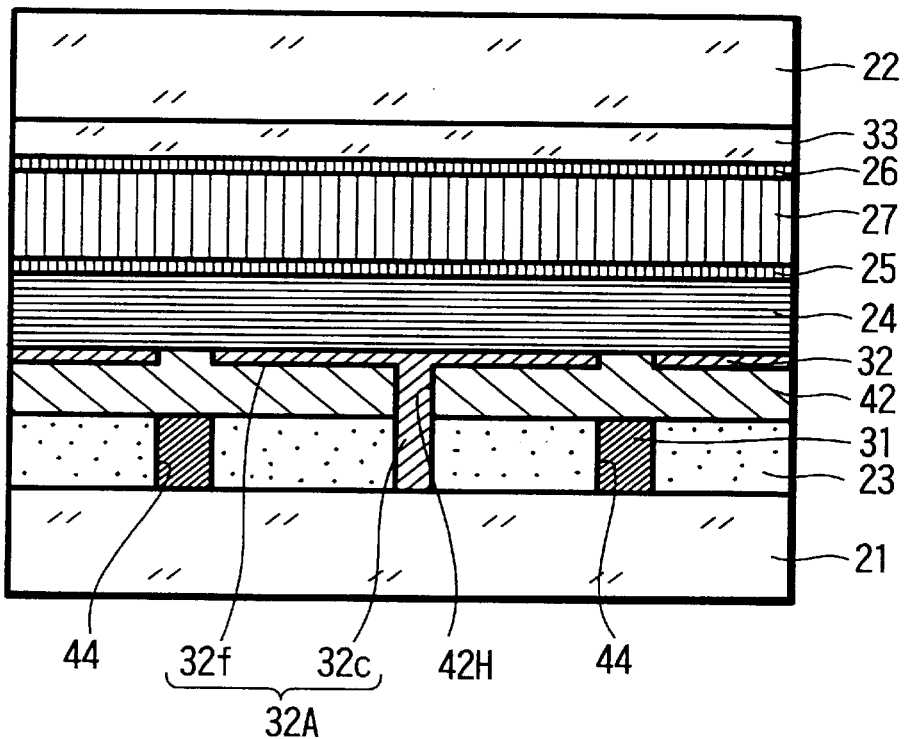
FIG. 21 is a schematic sectional view showing the main section of the optical writing type liquid crystal light valve apparatus of the present invention as another example.

In addition, as shown in FIGS. 20 and 21, the first electrode 31 can be formed in such a manner that after the photoconductive layer 23 is formed, transmitting holes 44 with a matrix pattern, for example, which pierce through the photoconductive layer 23, is formed and the transmitting holes 44 are charged with the first electrode 31.

Furthermore, the contact section 32c of the second electrode 32 contacting with the photoconductive layer 23 can be formed so as to pierce through the photoconductive layer 23 as shown in FIG. 21.

In FIGS. 20 and 21, the same reference numerals are given to the parts corresponding to those of FIGS. 3 through 19, and the overlapped description thereof is omitted.

According to the aforementioned structure of the present invention, when the opposing area, where the first and second electrodes 31 and 32 substantially face each other via the photoconductive layer 23, is reduced, the capacity relating to the photoconductive layer 23 is reduced, and thus the photoconductive layer 23 can be thinned sufficiently up to 1 to 2 μm, for example, which is required to absorb the lights. Therefore, since the capacity relating to the liquid crystal layer and the capacity relating to the photoconductive layer can be set to be a predetermined balancing relationship, the applied voltage to the liquid crystal layer can be set as maximally as possible, and the sensitivity can be improved.

Further, when the electric charge diffusion restricting area 40 is provided on the photoconductive layer 23, the photoconductive layer 23 is thinned and thus the diffusion of the electric charges in the photoconductive layer 23 can be avoided efficiently. As a result, the high contrast and resolution can be realized.

The producing process is simplified by thinning the photoconductive layer, and warpage of the photoconductive layer, which occurs when the thickness of the photoconductive layer becomes larger, can be avoided. As a result, the production cost is reduced and the reliability is improved.

Further, when the above-mentioned fourth electrode 34 is provided, the capacity of the liquid crystal can be made large apparently, and thus the capacity relating to the photoconductive layer, which is set so as to be balanced with the capacity of the liquid crystal, can be increased. As a result, the thickness of the photoconductive layer can be made smaller, and the diffusion of the electric charges in the photoconductive layer 23 is avoided. As a result, the high contrast and resolution can be realized, and the producing process can be simplified and the producing cost can be reduced more efficiently.

In addition, in the present invention, as mentioned above, by the arrangement of the first and second electrodes 31 and 32 and the fourth electrode 34, for example, the writing light LW directing to the liquid crystal layer 27 and the reading light LR directing to the photoconductive layer 23 can be shielded efficiently. As a result, the provision of the conventional light shielding layer made of CdTe can be avoided so that the production can be simplified, the cost can be reduced and the environmental problem can be solved.

Here, the apparatus of the present invention is not limited to the examples shown in the drawings. For example, the split electrode 32A of the second electrode 32 is not limited to the structure such that it is provided at each of pixels. That is, the split electrodes 32A can be constituted so that each of them is further divided at every pixel or that one split electrode 32A is arranged for two or more pixels.

In addition, the first electrode 31 is not limited to the matrix pattern that has the openings 31H corresponding to the respective split electrodes 32A of the second electrode 32 as shown in FIGS. 22 and 23. For example, the first electrode 31 can have a parallel stripe pattern such that one opening is formed for two or more split electrodes 32A, namely, a common opening is formed for the split electrodes 32A arranged on a common vertical line. In such a manner, various modifications can be applied.

In addition, for example, the electric charge diffusion restricting area 40 can be provided in the examples after FIG. 6, and thus the structure can adopt various combinations. Therefore, the present invention is not limited to the examples in the drawings, so various modifications and changes can be made in the structure of the present invention.

According to the optical writing type liquid crystal light valve apparatus of the present invention, since the capacity relating to the photoconductive layer 23 can be reduced, while the applied voltage to the liquid crystal layer is made to be maximum, namely, the sensitivity is heightened, the photoconductive layer can be thinned up to 1 to 2 μm that is required for the absorption of the light.

Further, when the electric charge restricting area 40 is provided to the photoconductive layer 23, the photoconductive layer 23 is thinned and the diffusion of the electric charges in the photoconductive layer 23 can be avoided efficiently. As a result, the high contrast and resolution can be realized.

When the photoconductive layer is thinned, the producing process is simplified, and warpage, which occurs when the thickness is large, can be avoided. Moreover, the yield is improved, and the producing cost is reduced.

Furthermore, when the fourth electrode 34 is provided, the capacity of the liquid crystal layer can be increased apparently, and thus the capacity relating to the photoconductive layer, which is set so as to be balanced with the capacity of the liquid crystal layer, can be further increased. As a result, the thickness of the photoconductive layer can be made smaller, and the diffusion of the electric charges in the photoconductive layer 23 is avoided. Therefore, the high contract and resolution can be realized, the producing process can be simplified and the producing cost can be reduced.

In addition, in the present embodiment, as mentioned above, since by the arrangement of the first and second electrodes and the fourth electrode 34, the writing light LW directing to the liquid crystal layer 27 and the reading light LR directing to the photoconductive layer 23 can be shielded efficiently. As a result, the arrangement of the conventional light shielding layer made of CdTe can be avoided, and the production can be simplified. Moreover, the cost can be reduced and the environmental problem can be improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical writing type liquid crystal light valve apparatus, comprising:
   first and second transparent substrates;
   a photoconductive layer;
   first and second electrodes arranged so as to sandwich the photoconductive layer;
   an optical reflective layer;
   a liquid crystal layer; and
   a third electrode,
   wherein the second electrode is composed of split electrode sections which are obtained by dividing the second electrode into a plurality of electrode sections;
   at least one portion of the first electrode is located at a position to face a portion between the split electrode sections; and
   an opposing area between the first and second electrodes is set so as to be smaller than an area of the second electrode.

2. The optical writing type liquid crystal light valve apparatus according to claim 1, wherein an electric charge diffusion restricting area for restricting diffusion of electric charges is formed on the photoconductive layer.

3. The optical writing type liquid crystal light valve apparatus according to claim 2, wherein the electric charge diffusion restricting area is composed of an area of the photoconductive layer where its substantial thickness is smaller than that of the other portions.

4. The optical writing type liquid crystal light valve apparatus according to claim 2, wherein the electric charge diffusion restricting area is formed by an insulating layer embedded into the photoconductive layer.

5. The optical writing type liquid crystal light valve apparatus according to claim 2, wherein the electric charge diffusion restricting area is formed by a layer where mobility of electric charges is low and which is embedded into the photoconductive layer.

6. An optical writing type liquid crystal light valve apparatus, comprising:
   first and second transparent substrates;
   a photoconductive layer;
   first and second electrodes arranged so as to sandwich the photoconductive layer;
   an optical reflective layer;
   a liquid crystal layer; and
   a third electrode,
   wherein the second electrode is composed of split electrode sections which are obtained by dividing the second electrode into a plurality of electrode sections;
   the split electrode section has an opposing electrode section which faces the third electrode across the liquid crystal layer, and a contact section which is electrically connected with the opposing electrode section and comes in contact with the photoconductive layer; and
   a contact area of the contact section with the photoconductive layer is set so as to be smaller than an area of the opposing electrode section.

7. The optical writing type liquid crystal light valve apparatus according to claim 6, wherein a fourth electrode is arranged between the photoconductive layer and surfaces of the split electrode sections of the second electrode where the opposing electrodes are disposed via an insulating layer.

8. The optical writing type liquid crystal light valve apparatus according to claim 6, wherein a fourth electrode is arranged at a position to face a portion between the split electrode sections, between the photoconductive layer and surfaces of the split electrode sections of the second electrode where the opposing electrodes are disposed.

9. The optical writing type liquid crystal light valve apparatus according to claim 6, wherein a fourth electrode is arranged at a position to face the opposing electrode sections of the split electrode sections, between the photoconductive layer and surfaces of the split electrode sections of the second electrode where the opposing electrodes are provided.

10. The optical writing type liquid crystal light valve apparatus according to claim 6, wherein:

a fourth electrode is arranged at a predetermined position to face a portion between the opposing electrode sections of the split electrode sections, between the photoconductive layer and surfaces of the split electrode sections of the second electrode where the opposing electrodes are provided so as to cover whole widths of the gaps of the opposing electrode sections;

the first electrode is arranged at a position to face the portion of the opposing electrode sections of the split electrode sections via the fourth electrode; and the first electrode is composed so that an opposing portion between the split electrode sections and the opposing electrode sections is arranged in an inner side further than a width of the fourth electrode.

11. The optical writing type liquid crystal light valve apparatus according to claim 6, wherein an electric charge diffusion restricting area for restricting diffusion of electric charges is formed on the photoconductive layer.

12. The optical writing type liquid crystal light valve apparatus according to claim 11, wherein the electric charge diffusion restricting area is composed of an area of the photoconductive layer where its substantial thickness is smaller than that of the other portions.

13. The optical writing type liquid crystal light valve apparatus according to claim 11, wherein the electric charge diffusion restricting area is formed by an insulating layer embedded into the photoconductive layer.

14. The optical writing type liquid crystal light valve apparatus according to claim 11, wherein the electric charge diffusion restricting area is formed by a layer where mobility of electric charges is low and which is embedded into the photoconductive layer.

15. The optical writing type liquid crystal light valve apparatus of claim 6, wherein the first electrode is in a shape of a line of a matrix pattern.

16. A method of producing an optical writing type liquid crystal light valve apparatus having at least first and second transparent substrates, a photoconductive layer, first and second electrodes which are arranged so as to contact with the photoconductive layer, an optical reflective layer, a liquid crystal layer and a third electrode, the second electrode being composed of a plurality of split electrode sections, comprising:

forming an electric charge diffusion restricting area, for selectively restricting diffusion of electric charges, on the photoconductive layer.

17. The method of producing the optical writing type liquid crystal light valve apparatus according to claim 16, wherein in the step of forming the electric charge diffusion restricting area, an ion is implanted selectively into a portion of the photoconductive layer where the electric charge diffusion restricting area is formed so that the electric charge diffusion restricting area where one of mobility of electric charges where electrical conduction is low, is formed.

18. The method of producing the optical writing type liquid crystal light valve apparatus according to claim 16, wherein in the step of forming the electric charge diffusion restricting area, the step of forming a concave section selectively in a portion of the photoconductive layer where the electric charge diffusion restricting area is formed, and the step of forming an insulating layer on at least one portion in the concave section are executed so that the electric charge diffusion restricting area is formed.

19. The method of producing the optical writing type liquid crystal light valve apparatus according to claim 16, wherein in the step of forming the electric charge diffusion restricting area, an insulating layer is formed selectively by oxidation or nitriding treatment by means of heating or plasma enhancement so that the electric charge diffusion restricting area is formed.

20. An optical writing type liquid crystal light valve apparatus, comprising:

first and second transparent substrates;

a photoconductive layer;

first and second electrodes arranged on a same surface side of the photoconductive layer;

an optical reflective layer;

a liquid crystal layer; and a third electrode, wherein the second electrode is composed of split electrode sections which are obtained by dividing the second electrode into a plurality of electrode sections;

the split electrode section has an opposing electrode section which faces the third electrode across the liquid crystal layer, and a contact section which is electrically connected with the opposing electrode section and comes in contact with the photoconductive layer; and a contact area of the contact section with the photoconductive layer is set so as to be smaller than an area of the opposing electrode section.

* * * * *